(12) United States Patent
Norieda

(10) Patent No.: US 8,842,097 B2
(45) Date of Patent: Sep. 23, 2014

(54) COMMAND INPUT DEVICE, MOBILE INFORMATION DEVICE, AND COMMAND INPUT METHOD

(75) Inventor: Shin Norieda, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 13/057,371

(22) PCT Filed: Jun. 25, 2009

(86) PCT No.: PCT/JP2009/061605
§ 371 (c)(1),
(2), (4) Date: Feb. 3, 2011

(87) PCT Pub. No.: WO2010/024029
PCT Pub. Date: Mar. 4, 2010

(65) Prior Publication Data
US 2011/0134083 A1    Jun. 9, 2011

(30) Foreign Application Priority Data
Aug. 29, 2008  (JP) ................................. 2008-222932

(51) Int. Cl.
*G06F 3/043* (2006.01)
*H04M 1/23* (2006.01)
*G06F 1/16* (2006.01)
*G06F 3/01* (2006.01)

(52) U.S. Cl.
CPC .................. *G06F 3/011* (2013.01); *H04M 1/23* (2013.01); *G06F 1/1684* (2013.01); *G06F 1/1626* (2013.01); *G06F 3/0433* (2013.01); *G06F 1/1624* (2013.01); *H04M 2250/12* (2013.01)
USPC ........... 345/177; 345/156; 345/157; 345/158; 345/159; 345/160; 345/170; 345/173; 178/18.01

(58) Field of Classification Search
USPC ................................. 345/156–173; 178/18.01
See application file for complete search history.

(56) References Cited

U.S. PATENT DOCUMENTS

| 6,965,842 | B2 * | 11/2005 | Rekimoto | 702/150 |
|---|---|---|---|---|
| 7,498,956 | B2 * | 3/2009 | Baier et al. | 341/20 |
| 7,593,005 | B2 * | 9/2009 | Bayramoglu | 345/177 |
| 2003/0056278 | A1 * | 3/2003 | Kuo et al. | 2/160 |
| 2004/0036678 | A1 * | 2/2004 | Zngf | 345/168 |

(Continued)

FOREIGN PATENT DOCUMENTS

| JP | 2-113317 A | 4/1990 |
|---|---|---|
| JP | 5-11919 A | 1/1993 |

(Continued)

OTHER PUBLICATIONS

International Search Report for PCT/JP2009/061605 mailed Jul. 21, 2009.

*Primary Examiner* — Grant Sitta
(74) *Attorney, Agent, or Firm* — Sughrue Mion, PLLC

(57) ABSTRACT

Provided are a command input device, a mobile information device, and a command input method which can easily be operated by a user even when the input unit in the device is small. A first and a second detection modules arranged on a device which is brought into contact with a user body detect vibration caused by a tapping operation on the user body and transmitted via the user body. The position of the tapping operation on the user body is identified according to analysis data obtained by analyzing the vibration relations detected by the first and the second detection modules such as a known correspondence between a time difference between the detection timings and the position of the tapping operation on the user body. Since the user body can be used as a space for inputting a command, it is possible to secure a sufficient input space.

8 Claims, 36 Drawing Sheets

(56) References Cited

U.S. PATENT DOCUMENTS

| | | | |
|---|---|---|---|
| 2004/0095311 A1* | 5/2004 | Tarlton et al. | 345/156 |
| 2004/0210166 A1* | 10/2004 | Soh et al. | 600/595 |
| 2004/0233174 A1* | 11/2004 | Robrecht et al. | 345/173 |
| 2004/0243342 A1* | 12/2004 | Rekimoto | 702/150 |
| 2005/0212777 A1* | 9/2005 | Ing et al. | 345/173 |
| 2005/0244166 A1* | 11/2005 | Shinagawa et al. | 398/186 |
| 2010/0066664 A1* | 3/2010 | Son et al. | 345/156 |

FOREIGN PATENT DOCUMENTS

| | | | |
|---|---|---|---|
| JP | 11-338597 A | | 12/1999 |
| JP | 2002190857 A | * | 7/2002 |
| JP | 2002351614 A | | 12/2002 |
| JP | 2003162362 A | | 6/2003 |
| JP | 2004537802 A | | 12/2004 |
| JP | 2005301874 A | | 10/2005 |
| JP | 2006323690 A | | 11/2006 |
| JP | 2007128304 A | | 5/2007 |
| WO | WO 2008069577 A1 | * | 6/2008 |
| WO | 2010024028 A | | 3/2010 |
| WO | 2010024030 A | | 3/2010 |
| WO | 2010024031 A | | 3/2010 |

* cited by examiner

FIG. 6

| | SECOND DETECTION UNIT VIBRATION TRANSMITTING TIME | FIRST DETECTION UNIT VIBRATION TRANSMITTING TIME | TIME DIFFERENCE (ON THE BASIS OF FIRST DETECTION UNIT) |
|---|---|---|---|
| FIRST AREA | $\dfrac{l_1}{2v} + \dfrac{l_2}{v} + \dfrac{l_3}{v}$ | $\dfrac{l_1}{2v}$ | LEAD $\dfrac{-l_2 - l_3}{v}$ |
| SECOND AREA | $\dfrac{l_2}{2v} + \dfrac{l_3}{v}$ | $\dfrac{l_1}{v} + \dfrac{l_2}{2v}$ | $\dfrac{l_1 - l_3}{v}$ |
| THIRD AREA | $\dfrac{l_3}{2v}$ | $\dfrac{l_1}{v} + \dfrac{l_2}{v} + \dfrac{l_3}{2v}$ | DELAYED $\dfrac{l_1 + l_2}{v}$ |

FIG. 9

| k<br>Rf | FIRST AREA | | SECOND AREA | | THIRD AREA | |
|---|---|---|---|---|---|---|
| | LOWER LIMIT | UPPER LIMIT | LOWER LIMIT | UPPER LIMIT | LOWER LIMIT | UPPER LIMIT |
| A1 (FOREFINGER) | — | — | — | — | — | — |
| | SA | | KA | | A | |
| A3 (MIDDLE FINGER) | -0.016 | -0.009 | — | — | — | — |
| | HA | | NA | | TA | |
| A3 (THIRD FINGER) | -0.015 | -0.008 | 0.001 | 0.007 | 0.010 | 0.020 |
| | RA | | YA | | MA | |
| A4 (LITTLE FINGER) | — | — | — | — | — | — |
| | # | | WA | | * | |

TB2

| SENSOR \ X Δt | 1 | 2 | 3 | · · · · | j | · · · · | m | — |
|---|---|---|---|---|---|---|---|---|
| A1 (FOREFINGER) | $a_{11}$ | $a_{12}$ | $a_{13}$ | · · · · | $a_{1j}$ | · · · · | $a_{1m}$ | $a_{1max}$ |
| A3 (MIDDLE FINGER) | $a_{21}$ | $a_{22}$ | $a_{23}$ | · · · · | $a_{2j}$ | · · · · | $a_{2m}$ | $a_{2max}$ |
| A3 (THIRD FINGER) | $a_{31}$ | $a_{32}$ | $a_{33}$ | · · · · | $a_{3j}$ | · · · · | $a_{3m}$ | $a_{3max}$ |
| A4 (LITTLE FINGER) | $a_{41}$ | $a_{42}$ | $a_{43}$ | · · · · | $a_{4j}$ | · · · · | $a_{4m}$ | $a_{4max}$ |
| B1 | $b_{11}$ | $b_{12}$ | $b_{13}$ | · · · · | $b_{1j}$ | · · · · | $b_{1m}$ | — |

TB1

SIGNAL WAVEFORM AT FIRST DETECTION UNIT

SIGNAL WAVEFORM AT SECOND DETECTION UNIT

SIGNAL WAVEFORM AT THIRD DETECTION UNIT (SIGNAL WAVEFORM TO BE CANCELLED)

SUBTRACT SIGNAL WAVEFORM OF THIRD DETECTION UNIT FROM SIGNAL WAVEFORM OF SECOND DETECTION UNIT (B-C)

FIG. 33

|   |    | t1 | | t2 | | t3 | |
|---|----|----|----|----|----|----|----|
|   |    | LOWER LIMIT | UPPER LIMIT | LOWER LIMIT | UPPER LIMIT | LOWER LIMIT | UPPER LIMIT |
| 1 | SA | -0.025 | -0.020 | -0.020 | -0.015 | -0.013 | -0.009 |
| 2 | TA | 0.010 | 0.020 | 0.007 | 0.013 | 0.010 | 0.020 |
| 3 | NA | -0.006 | -0.001 | -0.006 | -0.001 | -0.007 | -0.001 |
| ⋮ | HA | -0.019 | -0.015 | -0.025 | -0.020 | -0.020 | -0.016 |
| i | ⋮ | ⋮ | ⋮ | ⋮ | ⋮ | ⋮ | ⋮ |
| ⋮ | | | | | | | |
| m | | | | | | | |

TB3

COMMAND INPUT DEVICE, MOBILE INFORMATION DEVICE, AND COMMAND INPUT METHOD

TECHNICAL FIELD

The present invention relates to improvements in a command input device, a mobile information device, and a command input method, which are designed to perform command input processing by recognizing contents of input processing according to a point at which an input operation is executed.

BACKGROUND ART

As a command input device used for mobile information devices which place the importance on the portability, such as mobile phones, PDAs (Personal Digital Assistants), and notebook PCs, and mobile information devices which places the importance on the display units such as displays, desired is a device whose command input unit on the device is reduced in size.

As a method for reducing a key layout space of the command input unit on the device, there is considered a function of allotting a plurality of functions to a single input. As a method of such kind, for example, Patent Document 1 proposes a method which places a joystick on the device for detecting tilt angles in the top-and-bottom as well as left-and-right directions, and switches characters according to the tilt directions. However, it is required to get accustomed to operations for adjusting the tilt directions of the joystick for executing each input, so that the input operations become complicated. This may also cause input errors.

Further, Patent Document 2 also discloses a method which places a plurality of optical sensors that are independent from keys on an input unit, and allots input processing functions according to combinations of operation states of the optical sensors. However, as in the case of the method that utilizes the key combination operations, this method also faces complication of the operation itself.

Further, there is also a method which places a detection unit in a place different from a display unit such as a display. As such method, as disclosed in Patent Document 3, known is a method which places a tactile input protrusion unit on a back-face side of a reference terminal, and executes an input by applying a pressure. However, a display space is required within the display unit in order to check the input positions, so that it is necessary to increase the size of the display. Therefore, this method is not suited for reducing the size of the device itself. Further, the pitch of the input areas is narrow, so that it is difficult to set the input positions, etc.

Further, there is a method which individually places a detection unit separately from a device. As such method, there have been proposed devices which execute input operations by loading a detection unit to a human body, as disclosed in Patent Document 4, Patent Document 5, and Patent Document 6. However, it is necessary to prepare an input unit separately from the device, so that the portability thereof is poor. Further, it gives a troublesome feeling for operators who are required to wear the detection unit.

Furthermore, as an input module utilizing vibrations, there is known a type which detects a tapping operation conducted by a user, and automatically performs prescribed input processing that corresponds to strength levels and intervals of the tapping operation, as disclosed in Patent Document 7. However, since it is necessary to select a desired processing operation by adjusting the strength level and the interval of the tapping operation, it is still necessary for the user to have a specific skill.

Patent Document 1: Japanese Unexamined Patent Publication 2005-301874
Patent Document 2: Japanese Unexamined Patent Publication Hei 2-113317
Patent Document 3: Japanese Unexamined Patent Publication 2003-162362
Patent Document 4: Japanese Patent Application Publication 2004-537802
Patent Document 5: Japanese Unexamined Patent Publication Hei 11-338597
Patent Document 6: Japanese Unexamined Patent Publication 2007-128304
Patent Document 7: Japanese Unexamined Patent Publication 2002-190857

DISCLOSURE OF THE INVENTION

Problems to be Solved by the Invention

As described above, a first issue is as follows. That is, when a plurality of functions are allotted to a small input area, it is required to get accustomed to perform input actions for executing operations such as selections and finalizations made in the small input area. The reason is that it is required to get accustomed to execute input actions because complicated operations of operation systems are required when a plurality of functions are allotted to a small input area, and input operations different from character inputs using ten keys and the like employed often in known mobile phones, such as operations of a joystick, are required.

Further, a second issue is that input errors are increased in the selection and finalization operations done in the small input area. Since the pitch of the input areas is narrow, high positioning accuracy is required when making inputs by human hands. Therefore, in addition to the increase in the input errors, it also takes time for aligning positions.

Furthermore, a third issue is that the input checking capability is low in the input operations at the positions where the visual checking of the input actions is difficult. The reason is that it becomes impossible to check which position an input is made in a case where the input is done in the small input area where the input area is hidden by the inputting finger and in a case where the input area is located at a place different from the display surface of the device.

Further, a fourth issue is that it is a troublesome work for operators to be required to wear a detection unit. To wear the detection unit on the operators' body is an obstruction when the input operations are not to be performed, and it is a troublesome work to do detaching and wearing actions themselves. Further, for executing input operations on the body by loading the detection unit on the operators' body, an input unit is required separately from the device. Thus, it is not excellent in terms of the portability.

It is therefore an object of the present invention to provide a command input device, a mobile information device, and a command input method, with which an input unit individually provided from a device main body is unnecessary, operations thereof are simple without requiring any special skills, a sufficient input space can be secured without providing a large-area input space in the command input device itself, and a desired input operation can be securely selected without executing an accurate positioning operation.

Means for Solving the Problems

The command input device according to the present invention is a command input device structured to perform command input processing by recognizing input processing contents according to a point at which an input operation is conducted. In order to achieve the foregoing object, the command input device is characterized to particularly include:

a command input unit in which first and second detection modules for detecting vibrations generated by a tapping operation made on a body of a user and transmitted via the body of the user are disposed to be in contact with the body of the user at different positions on the command input device;

a judgment data storage module which stores in advance a corresponding relation between analysis data acquired by analyzing association regarding vibrations detected by the first and second detection modules and the points of the tapping operations made on the body of the user as a database;

a vibration analyzing module which acquires the analysis data by analyzing the association regarding the vibrations detected by the first and second detection modules every time the vibrations are detected by the first and second detection modules; and an operation point identifying module which identifies the point of the tapping operation made on the body of the user through searching the database in the judgment data storage module based on the analysis data acquired by the vibration analyzing module, and recognizes the point of the tapping operation as a point at which the input operation is conducted.

In order to achieve the same foregoing object, the mobile information device according to the present invention is characterized to load the command input device which includes:

a command input unit in which first and second detection modules for detecting vibrations generated by a tapping operation made on a body of a user and transmitted via the body of the user are disposed to be in contact with the body of the user at different positions on the command input device;

a judgment data storage module which stores in advance a corresponding relation between analysis data acquired by analyzing association regarding vibrations detected by the first and second detection modules and the points of the tapping operations made on the body of the user as a database;

a vibration analyzing module which acquires the analysis data by analyzing the association regarding the vibrations detected by the first and second detection modules every time the vibrations are detected by the first and second detection modules; and an operation point identifying module which identifies the point of the tapping operation made on the body of the user through searching the database in the judgment data storage module based on the analysis data acquired by the vibration analyzing module, and recognizes the point of the tapping operation as a point at which the input operation is conducted.

The command input method according to the present invention is a command input method structured to perform command input processing by recognizing input processing contents according to a point at which an input operation is conducted. In order to achieve the same foregoing object, the command input method includes:

detecting vibrations generated by a tapping operation made on a body of a user and transmitted via the body of the user at each of a first detection point and a second detection point on the body of the user; and identifying a point of the tapping operation made on the body of the user based on an already-known corresponding relation between associations of each of the detected vibrations and the points of the tapping operations made on the body of the user, and recognizing the point of the tapping operation as a point at which the input operation is conducted.

Effect of the Invention

The command input device, the mobile information device, and the command input method according to the present invention are designed to: detect a vibration generated by a tapping operation made on the body of the user and transmitted via the body of the user; identify the point at which the tapping operation is made on the body of the user based on a known corresponding relation between analysis data acquired by analyzing association of the vibration and points of the tapping operations on the body of the user; and recognize the point at which the tapping operation is made as a point at which an input operation is done. Thus, the body of the user can be utilized as a space for the command input.

Therefore, it is possible to secure the sufficient input space without providing a large-area input space in the command input device itself. This makes it possible to overcome such inconveniences that a plurality of functions are to be allotted to a single input area because of combinations of the complicated operation system and operations of a joystick, etc. Therefore, a skill regarding the input operations is not required, and the operations such as selections and finalizations can be easily comprehended and easily executed.

Further, since a sufficient input space can be secured, each function can be allotted to the large input area, thereby making it easy to conduct operations. Therefore, such inconveniences caused because the pitch of the input areas is narrow, i.e., an inconvenience that a high positioning accuracy for input operations is required for the user side and an inconvenience that it takes time for setting the position for the input operation, can be solved. Thus, generation of input errors can be prevented beforehand, and prescribed time required for input operations can be shortened as well.

Further, the display screen and the like of the device are not hidden by the finger conducting the input operation. In addition, the input processing is executed by the tapping operations done by the user oneself conducted on the user's body, so that the input operation can be checked extremely easily by the sense of touch and also the position at which the input is made can be grasped accurately without seeing the operation unit.

Furthermore, it is unnecessary to load the detection unit on the user's body, so that such inconveniences that the detection unit becomes an obstacle and the troublesome work of detaching and wearing operation of the detection unit can be solved completely. Further, it is unnecessary to carry any special detection unit separately from the device, so that it is excellent in terms of the portability.

Moreover, the input operations can be done only by simple tapping operations, so that it is unnecessary to select the input operations by adjusting the levels of the strength, the time intervals, and the like of the operations. As a result, the user can perform a desired input operation easily without doing any special training.

BRIEF DESCRIPTION OF THE DRAWINGS

FIG. 6 is a table showing logic values of detection time differences generated when a first area of the forefinger, a second area of the forefinger, and a third area of the forefinger are tapped;

FIG. 9 is a table showing setting examples of corresponding relations regarding upper-limit values and lower-limit values required for judging areas where tapping operations are conducted by corresponding to each of the first detection modules;

FIGS. 32A-32C show an external appearance of the PDA of the exemplary embodiment and a providing state of the first and second detection modules on the PDA, in which FIG. 32A shows a state where the PDA is being folded, FIG. 32B shows a state where the PDA is opened to be in use, and FIG. 32C specifically shows the providing state of the first and second detection modules on the PDA;

FIG. 33 is a conceptual chart showing an example of a table that stores corresponding relations between the combinations of the analysis data acquired by analyzing associations regarding the vibration detected by the first detection module and the vibration detected by the second detection module and the areas;

BEST MODES FOR CARRYING OUT THE INVENTION

Next, best modes for carrying out the present invention will be described in a specific manner through referring to some examples by making reference to the drawings.

First Exemplary Embodiment

Figure 1:
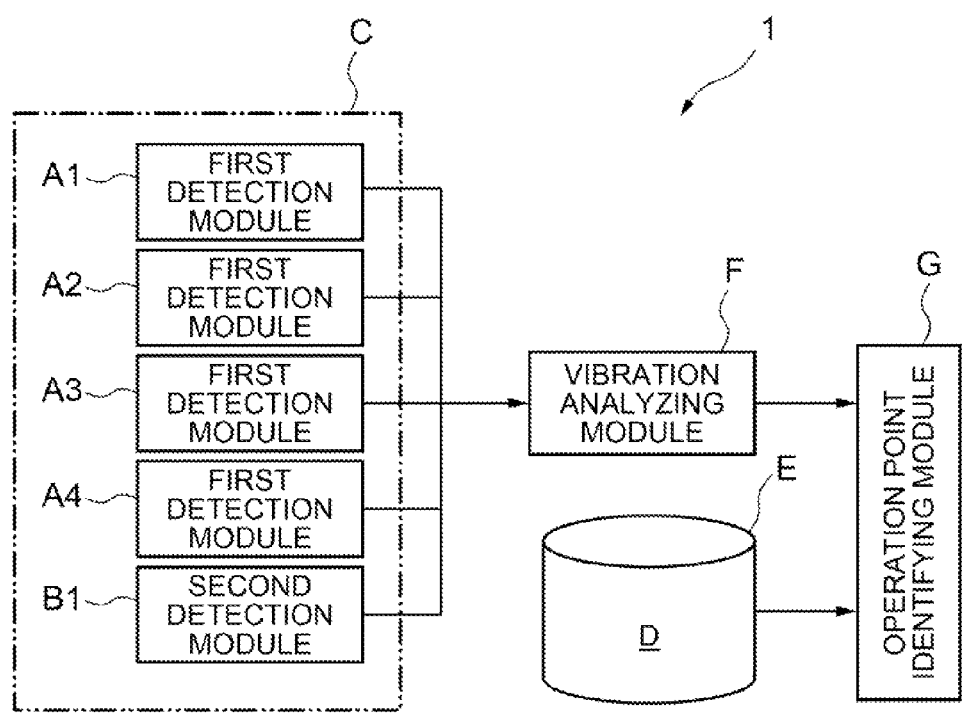
FIG. 1 is a functional block diagram showing the structure of a command input device according to an exemplary embodiment to which the present invention is applied.

FIG. 1 is a functional block diagram showing the structure of a command input device 1 of an exemplary embodiment to which the present invention is applied.

The command input device 1 according to this exemplary embodiment includes: a command input unit C which includes a plurality of first detection modules A1-A4 and a second detection module B1 which detect a vibration generated by a tapping operation made on the body of a user and transmitted via the body of the user; a judgment data storage module E which stores in advance a corresponding relation between analysis data acquired by analyzing the association in the vibrations detected by the first detection modules A1-A4 and the second detection module B1 and points of tapping operations made on the body of the user as database D; a vibration analyzing module F which acquires analysis data by analyzing the association regarding the vibrations detected by the first detection modules A1-A4 and the second detection module B1 every time the vibrations are detected by the first detection modules A1-A4 and the second detection module B1; and an operation point identifying module G which identifies the point of the tapping operation made on the body of the user through searching the database D in the judgment data storage module E based on the analysis data acquired by the vibration analyzing module F, and recognizes the point of the tapping operation as the point at which an input operation is conducted.

Among those, the first detection module A1-A4 and the second detection module B1 in the command input unit C are disposed to be in contact with the body of the user at different positions on the command input device 1.

Figure 2:
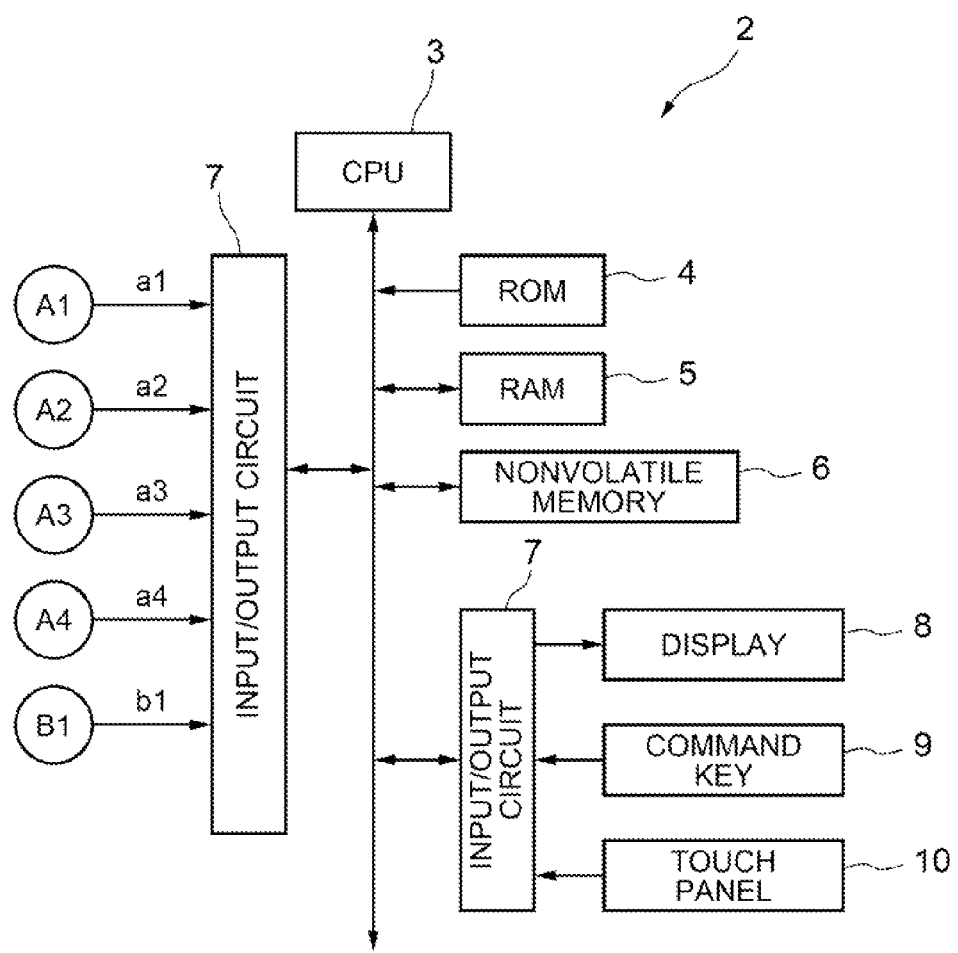
FIG. 2 is a block diagram showing an embodied structure of a case where the command input device is loaded particularly in PDA (Personal Digital Assistants) among portability-oriented mobile information devices.

FIG. 2 is a block diagram showing an embodied structure of a case where the command input device 1 is loaded particularly in PDA (Personal Digital Assistants) among portability-oriented mobile information devices.

As shown in FIG. 2, a PDA 2 includes: a microprocessor 3 used for arithmetic operation processing; a ROM 4 that stores a control program of the microprocessor 3; a RAM 5 used for temporarily storing arithmetic operation data and the like; and a nonvolatile memory 6 formed with a flash memory or the like for storing various kinds of user programs, user data, and the like. Further, a display 8 formed with a liquid crystal display plate or the like, and a command key 9 that is in a simple structure constituted with a cross-shaped key and the like for selecting operations or a touch panel 10 are connected to an input/output circuit 7 of the microprocessor 3 as a man-to-machine interface.

In this exemplary embodiment, further, a plurality of the first detection modules A1-A4 and second detection module B1 formed with acceleration sensors and the like are connected to the input/output circuit 7 of the microprocessor 3, so that signals a1-a4 outputted from the first detection modules A1-A4 and a signal b1 outputted from the second detection module B1 are read by the microprocessor 3 that functions as the vibration analyzing module F.

Further, in addition to a well-known control program required for achieving normal functions of the PDA 2, control programs (see FIG. 10-FIG. 12) peculiar to the exemplary embodiment required for functioning the microprocessor 3 of the PDA 2 as the vibration analyzing module F and the operation point identifying module G are stored in the ROM 4.

Figure 3:
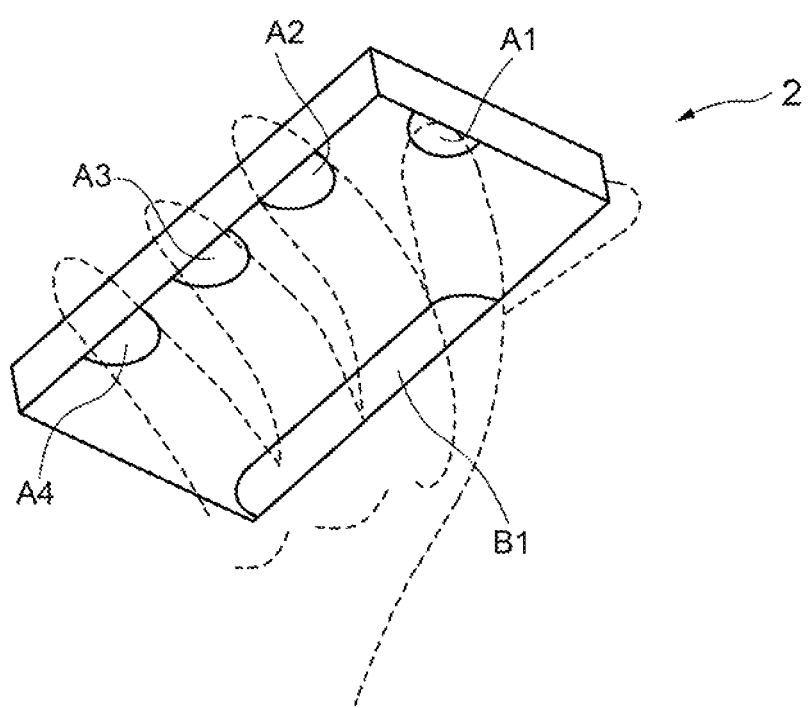
FIG. 3 is a perspective view taken from the back-face side of the PDA of the exemplary embodiment.

FIG. 3 is a perspective view taken from the back-face side of the PDA 2 to which the command input device 1 is loaded. As shown in FIG. 3, on the back-face side of a casing of the PDA 2 functioning also as the casing of the command input device 1, the first detection modules A1-A4 are disposed at positions corresponding to each of the end parts diverged from the body of the user, i.e., positions corresponding to respective fingertips of the forefinger, the middle finger, the third finger, and the little finger of a hand in this exemplary embodiment. Further, the second detection module B1 is disposed at a position in a part of the body of the user connecting to the base parts of the forefinger, the middle finger, the third finger, and the little finger as the end parts diverged from the body of the user, i.e., the position corresponding to the palm bottom part of the hand.

Therefore, in this case, the first detection points on the body of the user are the four fingers such as the forefinger, the middle finger, the third finger, and the little finger, and the second detection point on the body of the user is the palm bottom part.

Figure 13:
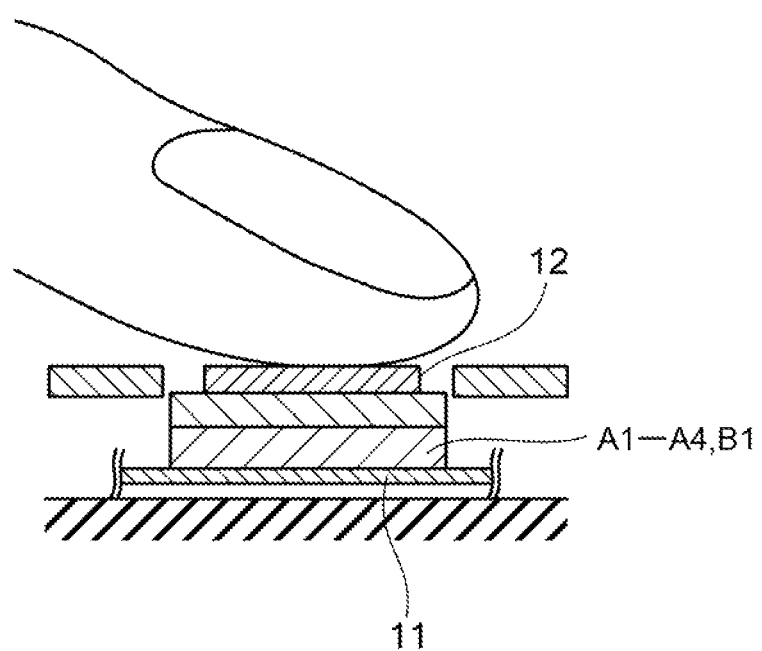
FIG. 13 is a sectional view showing an example of a state where the first and second detection modules are attached.
Figure 14:
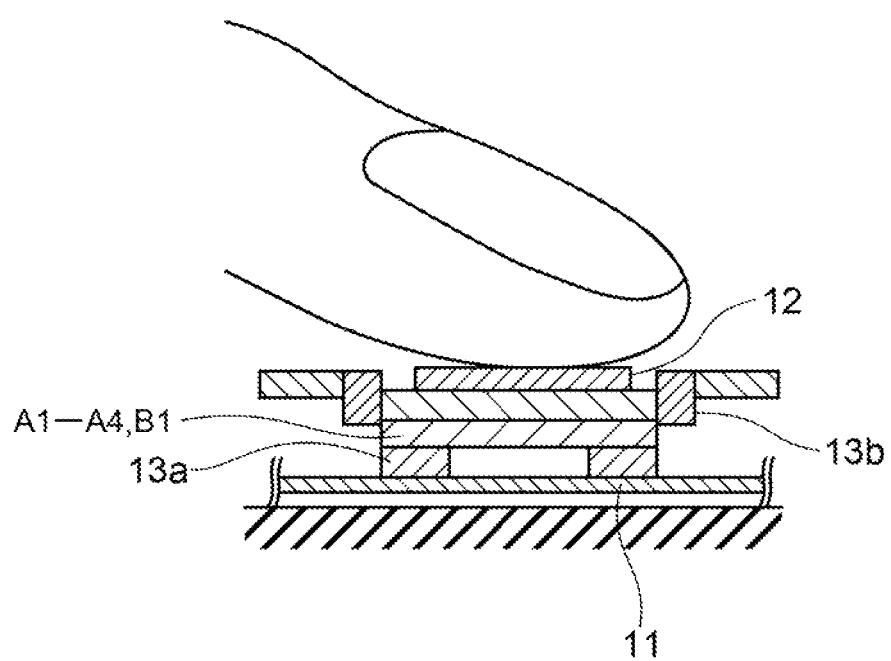
FIG. 14 is a sectional view showing another example of a state where the first and second detection modules are attached.

The acceleration sensor constituting the first detection modules A1-A4 and the second detection module B1 is attached on the back-face side of a wiring board 11 of the PDA 2 as shown in FIG. 13, and a key top 12 exposed towards the back face from the casing of the PDA 2 functioning also as the casing of the command input device 1 is fixed on the surface side of the first detection modules A1-A4 and the second detection module B1. Further, as shown in FIG. 14, the first detection modules A1-A4 and the second detection module B1 may be attached to the wiring board 12 by interposing an anti-vibration member 13a made of a low-resilience material such as urethane foam for decreasing transmission of the vibrations to be external disturbances therebetween, and also a rectangular-frame shaped anti-vibration member 13b for preventing the first detection modules A1-A4 and the second detection nodule B1 from vibrating by interfering with the opening of the casing may be placed to surround the periphery of the first detection modules A1-A4 and the second detection nodule B1. Such structures make it possible to eliminate the unnecessary external disturbances working on the first detection modules A1-A4 and the second detection nodule B1 and to transmit only the vibration transmitted from the fingertips and the palm bottom part of the user to the first detection modules A1-A4 and the second detection module B1 properly.

In this exemplary embodiment, as the points of tapping operations made on the body of the user, three areas are set in each finger by corresponding to the regions connecting each part of the body to be in contact with the first detection modules A1-A4, i.e., the respective fingertips of the forefinger, the middle finger, the third finger, the little finger, and the part of the body to be in contact with the second detection module B1, i.e., the palm bottom part (more specifically, three areas each are set in each finger along the each finger).

Figure 4:
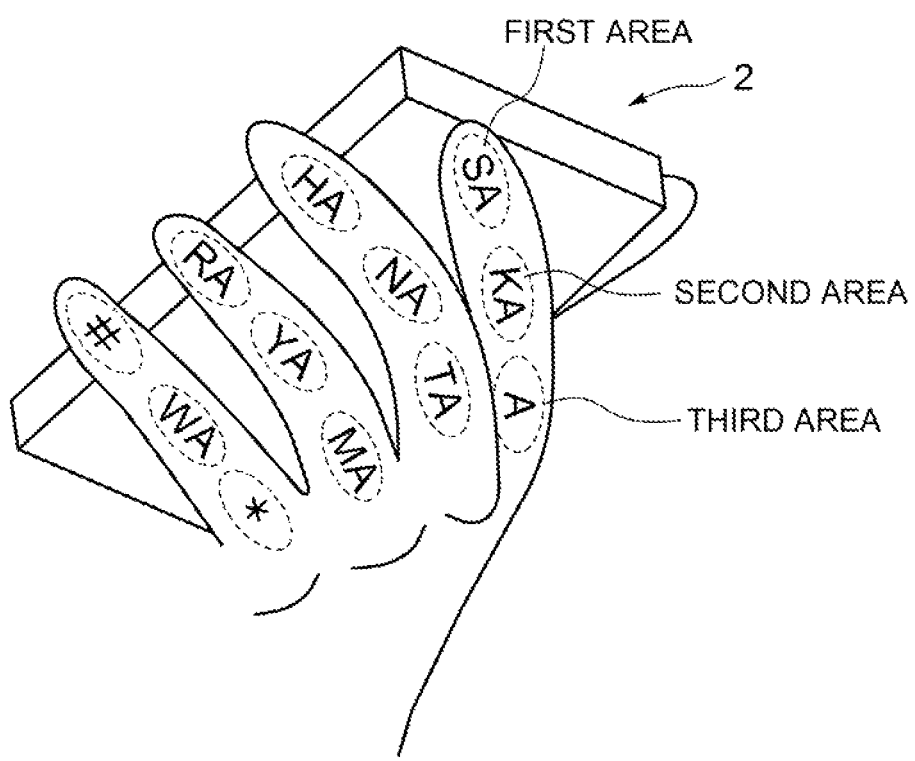
FIG. 4 is a conceptual illustration showing an example of a case when allotting body regions which connects finger tips touching a first detection module as points of tapping operations made on the body of a user and a palm bottom part touching a second detection module.

Specifically, as shown in FIG. 4, a section from the tip to the first joint of the forefinger is a first area of the forefinger, a section from the first joint to the second joint of the forefinger is a second area of the forefinger, and a section from the second joint to the third joint of the forefinger is a third area of the forefinger. Similarly, a section from the tip to the first joint of the middle finger is a first area of the middle finger, a section from the first joint to the second joint of the middle finger is a second area of the middle finger, and a section from the second joint to the third joint of the middle finger is a third area of the middle finger. Further, a section from the tip to the first joint of the third finger is a first area of the third finger, a section from the first joint to the second joint of the third finger is a second area of the third finger, and a section from the second joint to the third joint of the third finger is a third area of the middle finger. Furthermore, a section from the tip to the first joint of the little finger is a first area of the little finger, a section from the first joint to the second joint of the little finger is a second area of the little finger, and a section from the second joint to the third joint of the little finger is a third area of the little finger.

Figure 5:
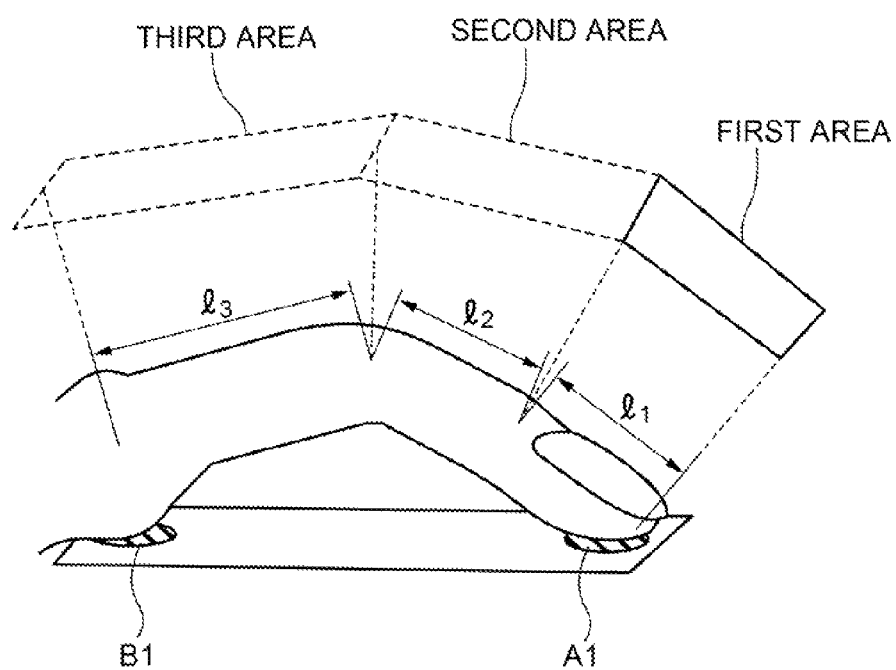
FIG. 5 is a model illustration showing an operating principle of a case when identifying the point of tapping operation made on the body of the user based on a time difference in detection timings of a vibration detected by the first detection module and a vibration detected by the second detection module by referring to a case of using a forefinger.

FIG. 5 is a model illustration showing the operation principle when identifying the point of the tapping operation made on the body of the user based on the time difference regarding the detection timing between the vibration detected by the first detection modules A1-A4 and the detection timing of the vibration detected by the second detection module B1 by referring to a case of the forefinger in a case where a tapping operation is conducted in a tapping operation point set to one of the fingers, i.e., in the first area, the second area, or the third area in one of the fingers.

In FIG. 5, the length of the section from the tip to the first joint of the forefinger is defined as l1, the length from the first joint to the second joint of the forefinger as l2, and the length of the section from the second joint to the third joint as l3. It is assumed here that a tapping operation is conducted in the first area of the forefinger, i.e., in the section from the tip to the first joint of the forefinger. Provided that the tapping operation is conducted in the center part of the first area, the vibration generated by the tapping operation is detected by the first detection module A1 via the path from the center part of the first area to the fingertip. Thus, the path length thereof becomes l1/2. Further, the same vibration is detected by the second detection module B1 via the path from the center part of the first area to the palm bottom, so that the path length thereof is l1/2+l2+l3. The transmission speed of the vibration is roughly uniform over the entire length of the forefinger that is formed with an elastic body constituted with bones, muscles, tendons, joints, skin, blood, and the like. Thus, provided that the transmission speed of the vibration is a specific value V, time required until the vibration generated by the tapping operation made on the center part of the first input area of the forefinger is detected by the first detection module A1 is l1/2V. Further, time required until the vibration generated by the tapping operation made on the center part of the first input area of the forefinger is detected by the second detection module B1 is l1/2V+l2/V+l3/V, and the time difference in the detection timings becomes (−l2−l3)/V as a result. In this case, it is obvious that l1/2<l/2+l2+l3 in the path lengths, so that the first detection module A1 is to detect the vibration earlier than the second detection module B1.

Similarly, provided that a tapping operation is conducted in the center part of the second area of the forefinger, the vibration generated by the tapping operation is detected by the first detection module A1 via the path from the center part of the second area to the first joint and from the first joint to the fingertip. Thus, the path length thereof is l2/2+l1. Further, the same vibration is detected by the second detection module B1 via the path from the center part of the second area to the palm bottom part, so that the path length thereof is l2/2+l3. As a result, the time difference in the detection timings becomes (l1−l3)/V. In this case, the center part of the forefinger is tapped as a whole, so that the first detection module A1 and the second detection module B1 are to detect the vibration almost simultaneously.

Similarly, provided that a tapping operation is conducted in the center part of the third area of the forefinger, the vibration generated by the tapping operation is detected by the first detection module A1 via the path from the center part of the third area to the second joint, from the second joint to the first joint and from the first joint to the fingertip. Thus, the path length thereof is l3/2+l2+l1. Further, the same vibration is detected by the second detection module B1 via the path from the center part of the third area to the palm bottom part, so that the path length thereof is l3/2. As a result, the time difference in the detection timings becomes (l1+l2)/V. In this case, it is obvious that l3/2+l2+l1>l3/2 in the path lengths, so that the second detection module B1 is to detect the vibration earlier than the first detection module A1.

The results thereof are collectively shown in a table of FIG. 6. The cases of the middle finger, the third finger, and the little finger are also the same as those described above in terms of the basic matters except that the lengths of l1, l2, and l3 themselves are different from those of the forefinger.

Figure 7:
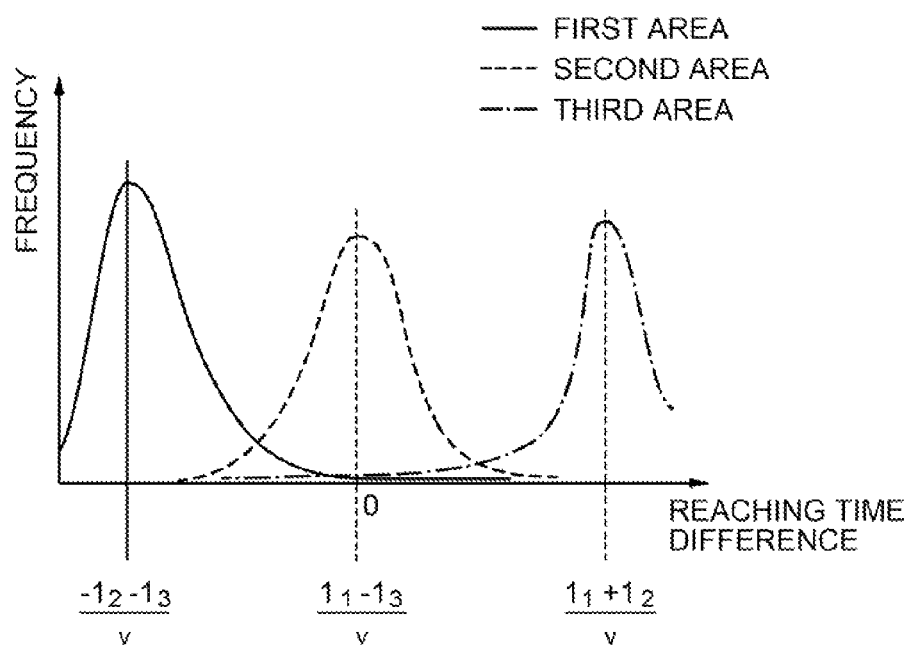
FIG. 7 is a graph showing variations in detection time differences generated when the first area of the forefinger, the second area of the forefinger, and the third area of the forefinger are tapped.
Figure 8:
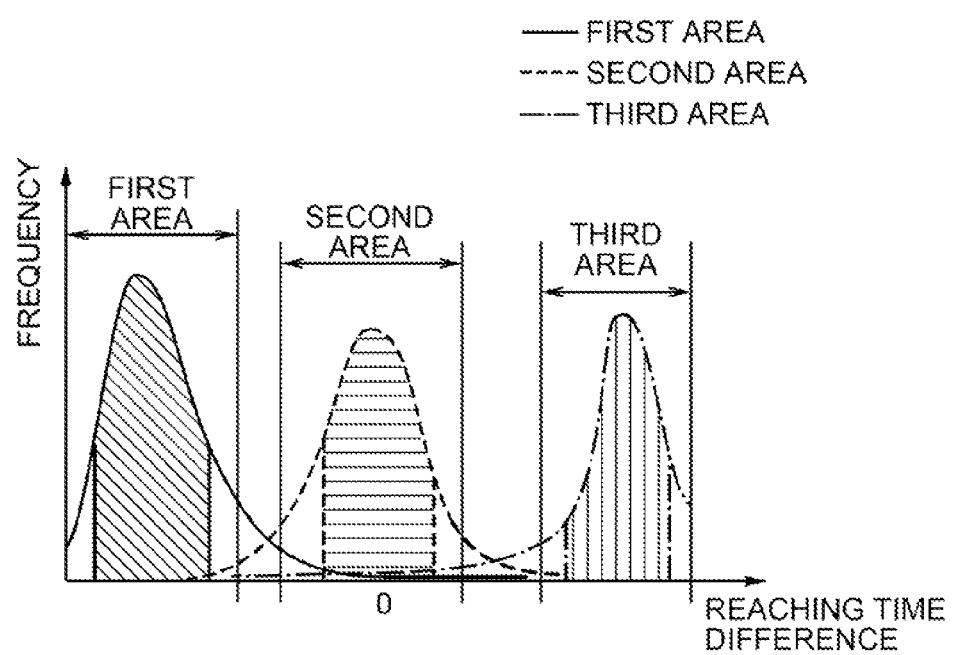
FIG. 8 is a conceptual chart showing setting examples of upper-limit values and lower-limit values for judging the tapped area.

However, in practice, tapping operations are not necessarily conducted accurately on the center part of each area. Further, there are individual differences in the size, shape, and structure of the forefinger depending on the users. Thus, there are variations of normal distribution as shown in a chart of FIG. 7 regarding the time difference (−l2−l3)/V in the detection timings between the first detection module A1 and the second detection module B1 when the first area of the forefinger is tapped, the time difference (l1−l3)/V in the detection timings between the first detection module A1 and the second detection module B1 when the second area of the forefinger is tapped, and the time difference (l1+l2)/V in the detection timings between the first detection module A1 and the second detection module B1 when the third area of the forefinger is tapped. Even in a case of such variations, it is possible to properly know whether the time difference regarding the detection timings between the first detection module A1 and the second detection module B1 generated every time the tapping operation of the forefinger is conducted is generated by a tapping operation made in the first area, by a tapping operation made in the second area, or by a tapping operation made in the third area through setting the judgment references so as not generate duplications between the neighboring areas by using a standard deviation corresponding to the variations, e.g., by using proper upper-limit values and lower-limit values as in FIG. 8.

This is completely the same for the cases of the middle finger, the third finger, and the little finger.

An example of the corresponding relation regarding the upper-limit values and the lower-limit values required for judging the area where a tapping operation is conducted by corresponding to each of the first detection modules A1-A4, i.e., the kinds of fingers such as the forefinger, the middle finger, the third finger, and the little finger is shown in a table TB 2 of FIG. 9. As described above, when a code of the upper-limit value and the lower-limit value is minus, it means that the first detection module A1 or A2, A3, A4 detects the vibration earlier than the second detection module B1. In the meantime, when the code of the upper-limit value and the lower-limit values is plus, it means that the second detection module B1 detects the vibration earlier than the first detection module A1 or A2, A3, A4.

When identifying the point of a tapping operation made on the body of the user based on the time difference regarding the detection timings of the vibration detected by the first detection modules A1-A4 and the vibration detected by the second detection module B1, the time difference regarding the detection timings of the vibration detected by the first detection modules A1-A4 and the vibration detected by the second detection module B1 itself is the analysis data that is acquired by analyzing the association regarding the vibration detected by the first detection modules A1-A4 and the vibration detected by the second detection module B1.

Therefore, the table TB 2 shown in FIG. 9 which registers the corresponding relation of the upper-limit values and the lower-limit values of the first areas, the second areas, and the third areas as the tapping operation points of each finger by corresponding to each of the first detection modules A1-A4, i.e., the kinds of the fingers such as the forefinger, the middle finger, the third finger, and the little finger, is registered in advance to the ROM 4 that functions as the judgment data storage module E of the command input device 1 as the database D which stores the corresponding relation regarding the analysis data and the points (areas) of the tapping operations.

The table TB 2 stores the known corresponding relation between the association regarding each of the detected vibrations and the tapping operation points made on the body of the user.

The table TB 2 of FIG. 9 is a database which stores the corresponding relation between the analysis data, i.e., the time difference regarding the detection timings of the vibrations, and the tapping operation points by corresponding to each of the first detection modules A1-A4. At the same time, it is also a database which stores the first area, the second area, and the third area connecting the fingertips to be in contact with the first detection modules A1-A4 and the palm bottom part to be in contact with the second detection module B1 as the tapping operation points on the body of the user.

Figure 10:
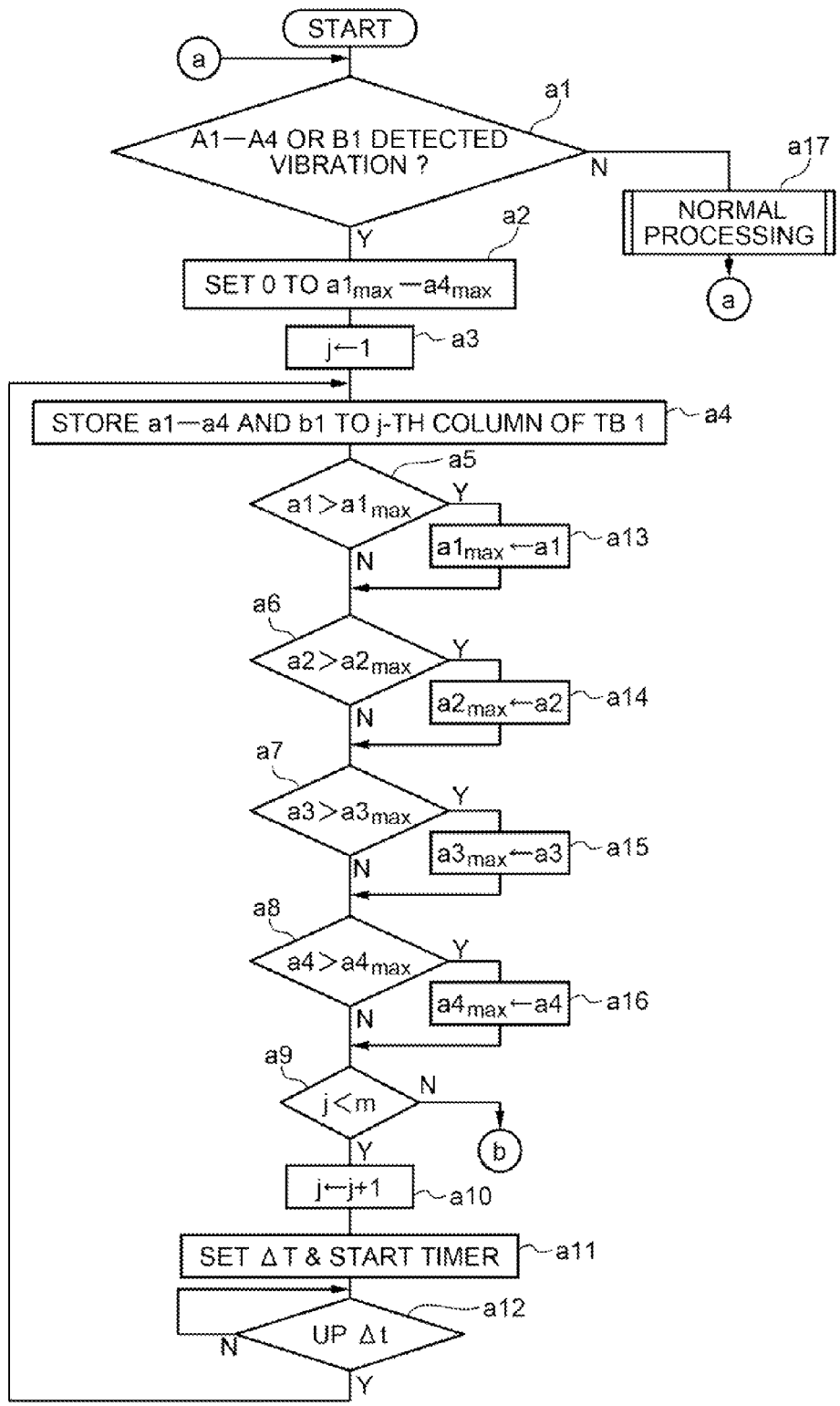
FIG. 10 is a flowchart showing the outline of processing actions of a microprocessor that functions as a vibration analyzing module and an operation point identifying module.
Figure 11:
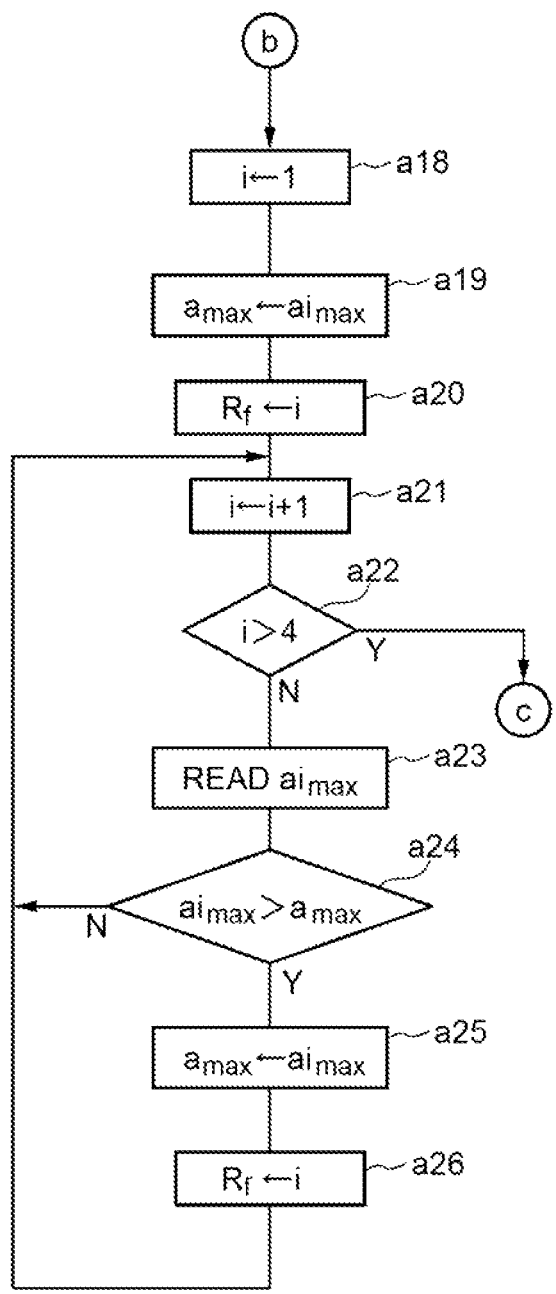
FIG. 11 is a flowchart showing the outline of following processing actions of the microprocessor that functions as the vibration analyzing module and the operation point identifying module.
Figure 12:
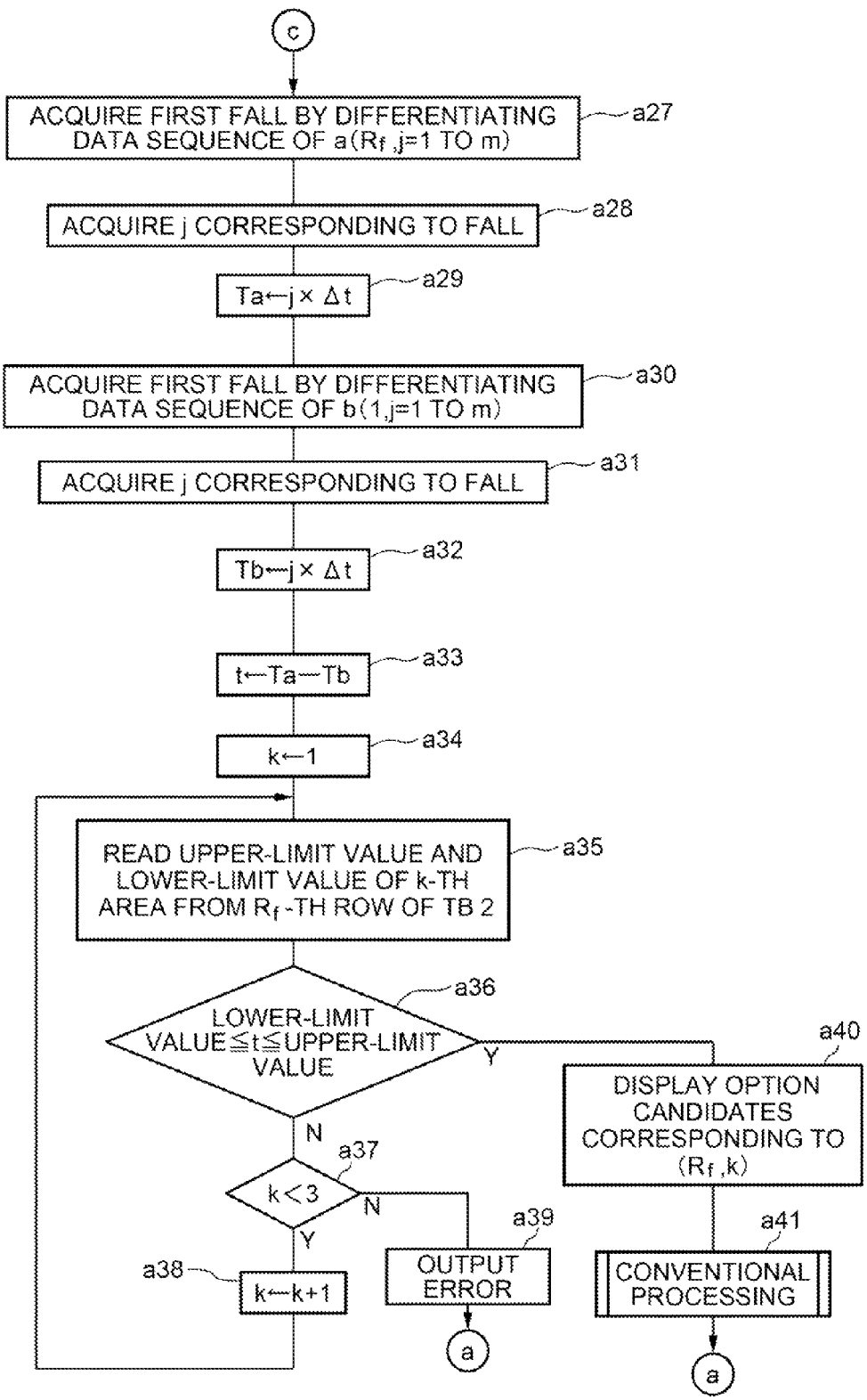
FIG. 12 is a flowchart showing the outline of following processing actions of the microprocessor that functions as the vibration analyzing module and the operation point identifying module.

FIG. 10-FIG. 12 are flowcharts showing the outline of the processing actions of a microprocessor 3 that functions as the vibration analyzing module F and the operation point identifying module G of the command input device 1.

Next, the processing actions (hereinafter, referred to as input judgment processing) of the microprocessor 3 functioning as the vibration analyzing module F and the operation point identifying module G will be described in a specific manner by referring to FIG. 10-FIG. 12.

The microprocessor 3 upon starting the input judgment processing first judges whether or not a vibration is detected by any of the first detection modules A1-A4 and the second detection module B1 (step a1).

If the vibration is not detected by any of the first detection modules A1-A4 and the second detection module B1, it means that there is no tapping operation made by the user on the fingers. Thus, the microprocessor 3 executes processing regarding the basic function of the PDA 2 as in conventional cases (step a17), and ends the input judgment processing of this period. When the tapping operation by the user is not detected, only the judgment processing of step a1 and the processing of step a17 are repeatedly executed. Thus, the PDA 2 functions in the same manner as that of the conventional PDA.

In the meantime, when the user executes a tapping operation on the finger and taps one of the areas out of the first areas, the second areas, and the third areas of one of the fingers such as the forefinger, the middle finger, the third finger, and the little finger holding the PDA 2 by using the hand that is not holding the PDA 2, a first vibration is detected by any of the first detection modules A1-A4 or the second detection module B1 (step a1).

As described above, there are cases where the first detection modules A1-A4 detect the vibration earlier than the second detection module B1 and cases where the second detection module B1 detects the vibration earlier than the first detection modules A1-A4. In the exemplary embodiment, sampling processing of signals outputted from the first detection modules A1-A4 and the second detection module B1 is started at a point where the first vibration is detected, so that the time difference regarding the detection timings of the first detection modules A1-A4 and the second detection module B1 can be acquired accurately.

The signals outputted from the first detection modules A1-A4 and the second detection module B1 are voltage values that are proportional to the magnitude of the vibration.

The microprocessor 3 confirming that the first vibration is detected by one of the first detection modules A1-A4 or the second detection module B1 first initializes all the values in a maximum value storage register $a1_{max}$ that stores the maximum value of the signals outputted from the first detection module A1 corresponding to the forefinger, a maximum value storage register $a2_{max}$ that stores the maximum value of the signals outputted from the first detection module A2 corresponding to the middle finger, a maximum value storage register $a3_{max}$ that stores the maximum value of the signals outputted from the first detection module A3 corresponding to the third finger, and a maximum value storage register $a4_{max}$ that stores the maximum value of the signals outputted from the first detection module A4 corresponding to the little finger to "0" (step a2), and sets an initial value "1" to a writing position identifying index j that identifies a column of a sampling data storage table TB 1 that is generated inside the RAM 5 for storing the sampling data (step a3).

Figure 15:
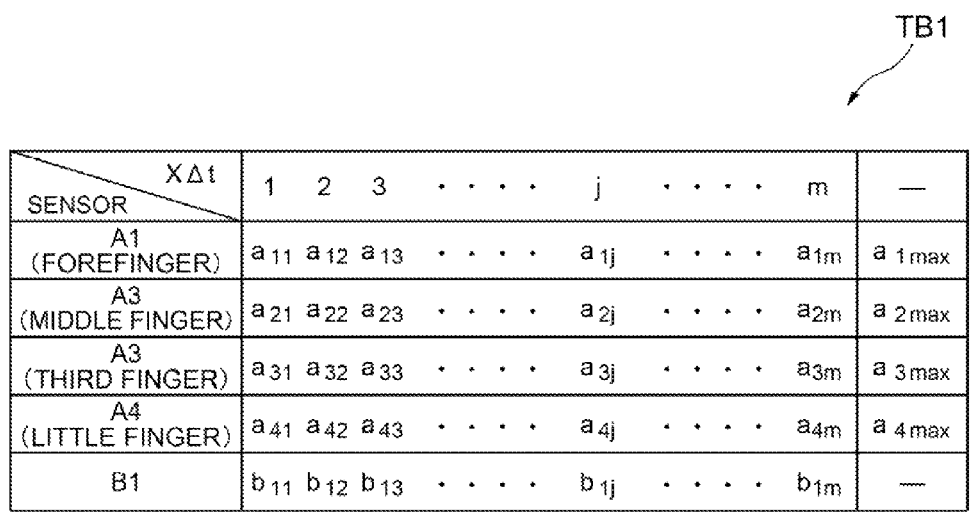
FIG. 15 is a conceptual chart showing an example of a sampling data storage table for sampling signals outputted from the first and second detection modules.

Then, the microprocessor 3 reads all of current values a1-a4 and b1 of the signals outputted from the first detection modules A1-A4 and the second detection module B1, and writes the values a1-a4 and b1 to the j-th column of the sampling data storage table TB 1 as shown in FIG. 15 based on the current values of the writing position identifying index j (step a4).

Further, the microprocessor 3 respectively compares the relation regarding the current values a1-a4 of the signals detected by the first detection modules A1-A4 in this sampling period with the values stored in the maximum value storage registers $a1_{max}$-$a4_{max}$ (step a5-step a8), and updates and sets the current value of the signal to the maximum value storage register only when the current value of the vibration is larger than the current value of the maximum value storage register (step a13-step a16).

Then, the microprocessor 3 judges whether or not the current value of the writing position identifying index j is within a range of sampling number in set in advance (step a9). When the current value of the writing position identifying index j is within a range of sampling number in set in advance, the microprocessor 3 increments the value of the writing position identifying index j by "1" (step a10), and sets a sampling period Δt to a sampling timer and starts the timer (step a11).

Further, the microprocessor 3 stands by until the sampling timer counts the sampling period Δt (step a12). When it is confirmed that the set sampling period Δt has passed, the microprocessor 3 shifts to the processing of step a4 again, and repeatedly executes the processing operation of step a4-step a12 in the same manner as described above.

Therefore, the sampling processing of the period Δt is started at the point where the first vibration is detected by any of the first detection modules A1-A4 or the second detection module B1. In the sampling data storage table TB 1, m-numbers each of the signals of the vibrations outputted from the first detection modules A1-A4 and the second detection module B1 are stored in a time series manner, i.e., over the sampling period of Δt·m in terms of time, while the maximum values of the detection signals detected by the first detection modules A1-A4 in the sampling period of Δt·m are saved in each of the maximum value storage registers a1$_{max}$-a4$_{max}$ as shown in FIG. 15, for example.

Figure 16A:
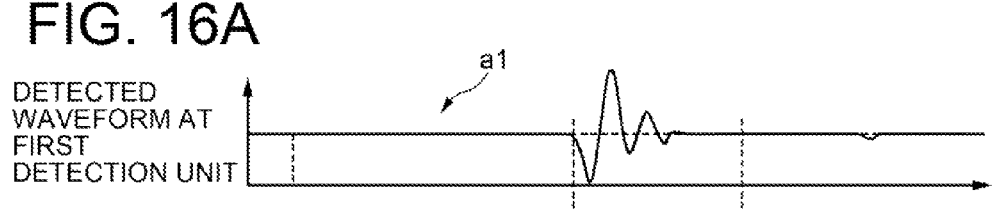
FIG. 16 shows charts of examples of relations regarding an output from the first detection module, an output from the second detection module, and a sampling period, in which (a) shows the output from the first detection module, (b) shows the output from the second detection module, and (c) shows the sampling period.
Figure 16B:
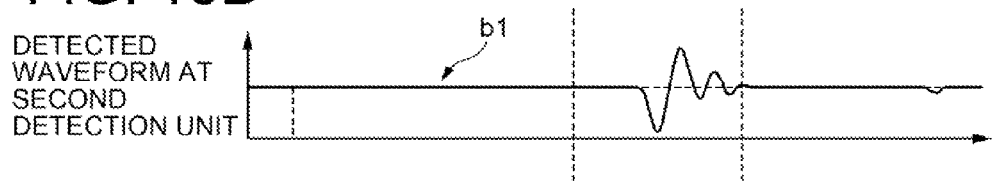
Figure 16C:
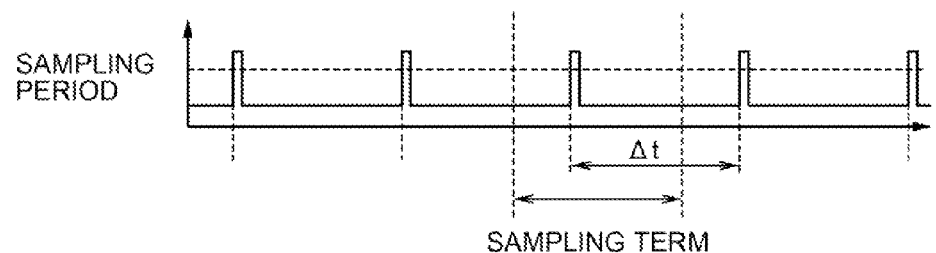

As an example, a corresponding relation regarding an output a1 from the first detection module A1 out of the first detection modules A1-A4 as well as an output b1 from the second detection module B1 and the sampling period of Δt is shown in FIG. 16 assuming that a tapping operation is conducted in the first area of the forefinger that is in contact with the first detection module A1. Specifically, (a) in FIG. 16 shows the output a1 from the first detection module A1, (b) in FIG. 16 shows the output b1 from the second detection module B1, and the interval of a clock wave in (c) in FIG. 16 shows the sampling period of Δt.

In the case of FIG. 16, the first area of the forefinger is tapped, so that the first detection module A1 detects the vibration earlier than the second detection module B1. On the contrary, when the third area of the forefinger is tapped, the second detection module B1 detects the vibration earlier than the first detection module A1. However, in any cases, this exemplary embodiment is designed to start the sampling processing at the point where one of the first detection modules A1-A4 and the second detection module B1 detects the first vibration, so that it is possible to collect the data required for acquiring the time difference regarding the detection timings of the first detection modules A1-A4 and the second detection module B1 to the sampling data storage table TB 1 securely regardless of which area of which finger is being tapped.

It is desirable to set the sampling continuing period Δt to be able to continue the sampling processing over the period where the signals outputted from the first detection modules A1-A4 and the second detection module B1 based on the vibration generated by the tapping operation made on the finger completely attenuate by taking the time required for transmission of the vibration, the time for the vibration to attenuate, and the like into consideration. However, when this period is set too long, the storage capacitance of the memory is occupied. Thus, it is necessary to take the time required for transmission of the vibration, the time for the vibration to attenuate, and the like into consideration carefully. Further, while it is preferable for the sampling period Δt to be shorter, there are also issues of the memory occupancy and the data transfer rate as in the above-described case. Thus, it is encouraged to set the value in an extent with which there is no delay generated in the input operation itself that utilizes tapping due to redundancy in the processing time.

In this exemplary embodiment, an input action is conducted by a tap operation to a position closest to the first detection modules A1-A4 or the second detection module B1, and the total value of reaching time difference required for transmission of the vibration at that time and the time interval until the vibration waveform of a given tapping operation becomes stabilized by attenuation is used as the sampling period.

Further, when it is confirmed by the judgment processing executed in step a9 that the current value of the writing position identifying index j has reached the sampling number m set in advance, the microprocessor 3 functioning as the operation point identifying module G sets an initial value "1" to a maximum value searching index i for searching the register that stores the maximum value among the maximum value storage registers a1$_{max}$-a4$_{max}$ that store the maximum values of the signals detected by each of the first detection modules A1-A4 (step a18), sets a value of the maximum value storage register ai$_{max}$ to a provisional maximum value storage register a$_{max}$ based on the current value of the maximum value searching index i (step a19), and sets the same value as the current value of the maximum value searching index i as an initial value to an operation finger identifying index Rf for identifying the first detection module that detects the greatest vibration, i.e., the first detection module that corresponds to the actually tapped finger (step a20).

Then, the microprocessor 3 functioning as the operation point identifying module G increments the value of the maximum value searching index i by "1" (step a21), and judges whether or not the current value of the index i exceeds the total number "4" of the first detection modules (step a22).

When the current value of the maximum value searching index i does not exceed the total number "4" of the first detection modules, the microprocessor 3 functioning as the operation point identifying module G reads the value of the next maximum value storage register ai$_{max}$ based on the current value of the updated maximum value searching index i (step a23), and compares the relation regarding the values of the provisional maximum value storage register a$_{max}$ and the maximum value storage register ai$_{max}$ (step a24). Only when the value of the maximum value storage register ai$_{max}$ is i larger than the current value of the provisional maximum value storage register a$_{max}$, the microprocessor 3 updates and sets the value of the maximum value storage register ai$_{max}$ specified by the index i to the provisional maximum value storage register a$_{max}$ (step a25), and also updates and sets the current value of the maximum value searching index i to the operation finger identifying index Rf (step a26).

Hereinafter, the microprocessor 3 functioning as the operation point identifying module G repeatedly executes the processing of step a21-step a24 or step a21-step a26 in the same manner as described above until the current value of the maximum value searching index i exceeds the total number "4" of the first detection modules.

Therefore, at last, the value of the maximum value storage register storing the greatest maximum value among the maximum value storage registers a1$_{max}$-a4$_{max}$ is stored in the provisional maximum value storage register a$_{max}$. Further, the value of the maximum value storage register ai$_{max}$ that stores the greatest maximum value, i.e., the value of the index i required for identifying the first detection module corresponding to the tapped finger, is saved in the operation finger identifying index Rf.

Therefore, in this exemplary embodiment, the processing from step a18-step a26 functions as an each-end-part operation point identifying function in the operation point identifying module G, i.e., functions as a part of the processing for identifying the first detection module that is in contact with the tapped finger based on the maximum values of the vibrations as the properties of the vibrations detected by the first detection modules A1-A4.

In this manner, when the value of the index i required for identifying the first detection module corresponding to the tapped finger is stored in the operation finger identifying index Rf and the judgment result of step a22 becomes true, the microprocessor 3 functioning as the vibration analyzing module F reads a series of sampling data a(Rf, 1)-a(Rf, m) related to the vibration detected by the first detection module A$_{Rf}$ corresponding to the tapped finger from a data sequence of the Rf-th row of the sampling data storage table TB 1 as shown in FIG. 15 (step a27), and acquires the value j of the sampling number corresponding to the fall point of the vibration by executing differentiation processing on the data sequence a(Rf, 1)-a(Rf, m) (step a28). Further, the microprocessor 3 acquires the generation time of the fall of the vibration by having the point at which the first vibration is detected as the start point by multiplying the value j of the sampling number by the sampling period Δt, and stores this time to a first detection module fall generation time storage register Ta (step a29).

Then, the microprocessor 3 functioning as the vibration analyzing module F reads a series of sampling data b(1, 1)-b(1, m) related to the vibration detected by the second detection module B1 from the sampling data storage table TB 1 as shown in FIG. 15 (step a30), and acquires the value j of the sampling number corresponding to the fall point of the vibration by executing differentiation processing on the data sequence b(1, 1)-b(1, m) (step a31). Further, the microprocessor 3 acquires the generation time of the fall of the vibration by having the point at which the first vibration is detected as the start point by multiplying the value j of the sampling number by the sampling period Δt, and stores this time to a second detection module fall generation time storage register Tb (step a32).

Then, the microprocessor 3 functioning as the vibration analyzing module F calculates the time difference regarding the detection timings between the first detection module $A_{Rf}$ corresponding to the actually tapped finger and the second detection module B1 by subtracting the value of the second detection module fall generation time storage register Tb from the value of the first detection module fall generation time storage register Ta, and stores this value to an analysis data storage register t as the analysis data that is acquired by analyzing the association regarding the vibrations detected by the first detection module $A_{Rf}$ and the second detection module B1 (step a33).

Figure 17A:
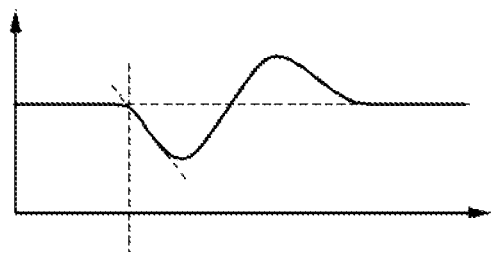
FIG. 17 shows charts regarding the operation principle of a case when calculating the time difference in detection timings between the first detection module and the second detection module by utilizing a vibration fall generation point as a feature point.
Figure 17B:
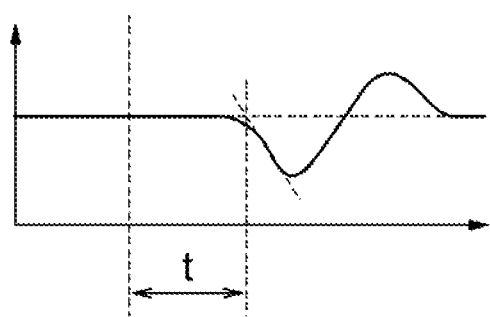

An example of the time difference regarding the detection timing between the first detection module $A_{Rf}$ corresponding to the actually tapped finger and the second detection module B1 is shown in charts of FIG. 17. The chart shown in (a) of FIG. 17 is the chart corresponding to a series of sampling data a(Rf, 1)-a(Rf, m) related to the vibration detected by the first detection module $A_{Rf}$, the chart shown in (b) of FIG. 17 is the chart corresponding to a series of sampling data b(1, 1)-b(1, m) related to the vibration detected by the second detection module B1, and the first detection module $A_{Rf}$ detects the vibration earlier than the second detection module B1 in the case of FIG. 17. More desirably, in the processing of step a28 and step a31, an intersection point between a tangent of the data of a stable waveform where the vibration has not reached and a tangent of a point where the fall of the vibration appears in the greatest level is extracted as the generation time of the fall of the vibration by having the point at which the first vibration is detected as the start point.

Figure 18A:
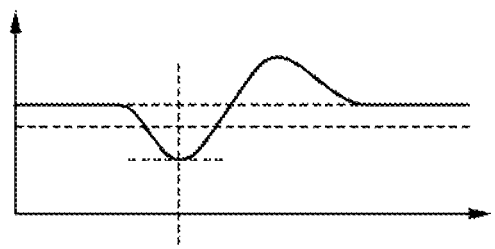
FIG. 18 shows charts regarding the operation principle of a case when calculating the time difference in detection timings between the first detection module and the second detection module by utilizing a vibration minimum value generation point as a feature point.
Figure 18B:
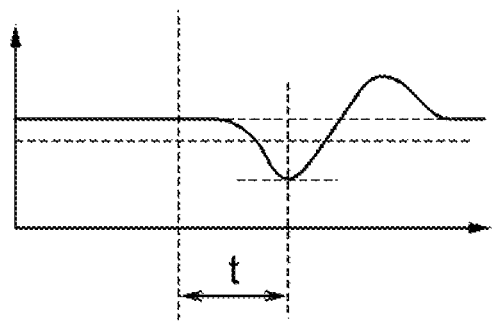
Figure 19A:
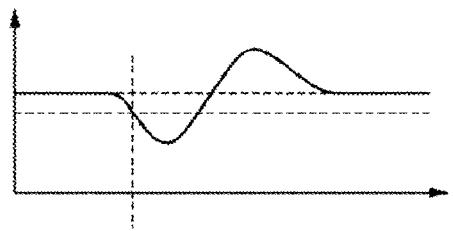
FIG. 19 shows charts regarding the operation principle of a case when calculating the time difference in detection timings between the first detection module and the second detection module by utilizing a point at which the vibration is deviated from a threshold value set in advance as a feature point.
Figure 19B:
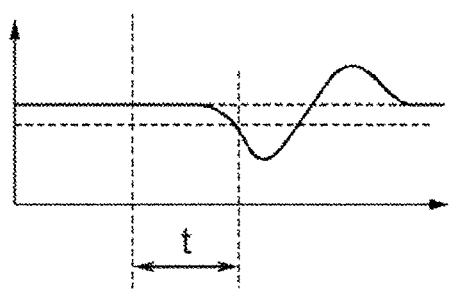

Here, the case of calculating the time difference t regarding the detection timings between the first detection module $A_{Rf}$ and the second detection module B1 by detecting the generation point of the fall of the vibration as the feature point has been described as a way of example. However, the time difference t regarding the detection timings between the first detection module $A_{Rf}$ and the second detection module B1 may be calculated by detecting the generation point of the minimum value of the vibration as the feature point as shown in FIG. 18, for example, or the time difference t regarding the detection timings between the first detection module $A_{Rf}$ and the second detection module B1 may be calculated by detecting the point at which the vibration is deviated from a preset threshold value of the vibration as the feature point as shown in FIG. 19. While these methods may sometimes be affected by the values of noises and the like, there is also an advantage of making it easier to extract the time to be the feature point. As a result, the processing speed can be increased.

There are cases where arrivals of the vibration are detected by detecting a rise of a signal instead of a fall thereof depending on the structures and properties of the first detection modules A1-A4 and the second detection module B1 formed by the acceleration sensors and the like. However, the both cases are equivalent technically whether it is detected by the rise or the fall of the signal.

Then, the microprocessor 3 functioning as the operation point identifying module G sets an initial value "1" to an area identifying index k for identifying the actually tapped area (step a34), reads values of the upper-limit value and lower-limit value of the k-th area from a data sequence of the Rf-th row, i.e., from a data sequence corresponding to the first detection module $A_{Rf}$ corresponding to the actually tapped finger, based on the current value of the index k from the table TB 2 as shown in FIG. 9 functioning as the database that stores the corresponding relation of the upper-limit values and the lower-limit values required for judging the areas (step a35), and judges whether or not the time difference t regarding the detection timings between the first detection module $A_{Rf}$ and the second detection module B1 calculated in the processing of step a33 is included between the upper-limit value and the lower-limit value of the k-th area (step a36).

When the detection timing difference t as the analysis data is not included between the upper-limit value and the lower-limit value of the k-th area, the microprocessor 3 functioning as the operation point identifying module G judges whether or not the current value of the index k is within the range of "3" that is the total number of the areas of one finger (step a37). Then, when the current value of the index k is within the range of "3" that is the total number of the areas of one finger, the microprocessor 3 functioning as the operation point identifying module G increments the value of the index k by "1" again (step a38), reads the values of the upper-limit value and the lower-limit value of the k-th area again from the data sequence of the Rf-th row of the table TB 2 as shown in FIG. 9 based on the current value of the updated index k (step a35), and again judges whether or not the time difference t regarding the detection timings is included between the upper-limit value and the lower-limit value of the k-th area (step a36).

When the judgment result of step a36 becomes true because the area k having the upper-limit value and the lower-limit value sandwiching the detection timing difference t therebetween is detected while the processing from step a35 to step a38 is repeatedly executed, it means that the tapping operation is conducted on the k-th area of the finger that is in contact with the first detection module $A_{Rf}$. Thus, the microprocessor 3 functioning as the end-part operation point identifying function achieving module of the operation point identifying module G identifies that the tapping operation is conducted on the finger that is in contact with the first detection module $A_{Rf}$ and that the tapping operation is conducted in the k-th area of that finger, and displays options of command input corresponding to the arrangement (Rf, k) that shows the combination of the first detection module or the finger and the area that is the tapping operation point on the display 8 of the PDA 2 (step a40).

For example, when the value of the operation finger identifying index Rf at the point where the repeated processing from step a21 to step a24 or from step a21 to step a26 is ended and the judgment result of step a22 turns out as true is "3", and the value of the area identifying index k at the point where the repeated processing from step a35 to step a38 is ended and the judgment result of step a36 turns out as true is "2", which is "(Rf, k)=(3, 2)", it means that the tapping operation is conducted in the second area (between the first joint and the second joint) of the third finger that is in contact with the first detection module A3.

In this exemplary embodiment, as shown in the table TB 2 of FIG. 9, the options corresponding to (Rf, k)=(3, 2) are the hiragana characters of "ya" row in Japanese. Thus, "ya", "yu", and "yo" in the hiragana characters are displayed on the display 8 of the PDA 2 as the hiragana characters that can be inputted.

Naturally, when it is "(Rf, k)=(1, 1)", "sa", "si", "su", "se", and "so" that are hiragana characters of "sa" row are displayed as the hiragana characters that can be inputted. Further, when it is "(Rf, k)=(2, 1)", "ha", "hi", "hu", "he", and "ho" that are the hiragana characters of "ha" row are displayed on the display 8 of the PDA 2 as the hiragana characters that can be inputted. In FIG. 4, the areas to be the tapping operation points are expressed as "a" in a circle for "(Rf, k)=(1, 3)", "ka" in a circle for "(Rf, k)=(1, 2)", "so" in a circle for "(Rf, k)=(1, 1)", "ta" in a circle for "(Rf, k)=(2, 3)", "na" in a circle for "(Rf, k)=(2, 2)", "ha" in a circle for "(Rf, k)=(2, 1)", "ma" in a circle for "(Rf, k)=(3, 3)", "ya" in a circle for "(Rf, k)=(3, 2)", "ra" in a circle for "(Rf, k)=(3, 1)", "*" in a circle for "(Rf, k)=(4, 3)", "wa" in a circle for "(Rf, k)=(4, 2)", and "#" in a circle for "(Rf, k)=(4, 1)". However, these are simply illustrated for showing the areas to be the operation points visually, and those characters are not actually written on the fingers of the user.

Here, while the case of using the hiragana characters as the options is specifically described, it is also possible to use English letters such as "A" to "Z" and numerical figures such as "0" to "9". Moreover, it is also possible to employ a structure with which some kind of functions such as "editing" (representing pasting, searching, replacing, etc.), "displaying" (representing print layout, draft, outline, etc), "format" (representing font, paragraph, multicolumn layout, etc.), and the like, for example, are allotted to each area, and one of functions from "pasting", "searching", "replacing", and the like is selected when the area of "editing" is being tapped.

Further, when a first detection module A5 (not shown) that comes in contact with the thumb, for example, is provided additionally, it is possible to secure an area to be a tapping operation point that corresponds to a clear key and a finalization key.

Further, while the areas to be the tapping operation points are set in the left hand or the back of the fingers thereof in this exemplary embodiment, the areas to be the tapping operation points are not limited only to the hands and the fingers. Each section of the body may be utilized as the areas to be the tapping operation points as necessary.

For example, in a case where a person stands on a device and the vibration transmitted to the soles of the left and right feet are detected by the first and second detection modules, it is possible to set the areas to be the tapping operation points to the left and right knees, shins or thighs, for example. In such case, there only needs one each of the first and second detection modules.

Further, in a case where the areas to be the tapping operation points are set to the hand or the back of the fingers, the target hand does not necessarily have to be a hand of a living body but may also be an artificial hand or the like.

Further, output signals from the first detection modules A1-A4 and the second detection module B1 may be let through a smoothing filter or through a bandpass filter that cuts the frequencies other than the frequency to be used as an impact of a tap operation to eliminate noises. The layout positions of the first detection module A1-A4 and the second detection module B1 may be any places as long as the body and the fingers are to be in contact therewith. Further, while the second detection module B1 is used in common to all the fingers in this exemplary embodiment, exclusively-used second detection modules B1-B4 (not shown) may be provided for each finger.

As the analysis data acquired by analyzing the association regarding the vibrations detected by the first and the second detection modules, it is also possible to use the ratio and the like of the minimum value (or the maximum value instead of the minimum value) of the vibrations detected by the first detection modules and the minimum value (or the maximum value instead of the minimum value) of the vibrations detected by the second detection module other than using the time difference regarding the detection timings of the vibrations. However, it is necessary to set the sampling period relatively longer for detecting the minimum value (or the maximum value instead of the minimum value). Thus, the time of preprocessing required for command input is increased, thereby generating a delay in the input operations.

As in this exemplary embodiment, with the structure that uses the time difference regarding the detection timings of the vibrations as the analysis data, particularly the structure that acquires the time difference of the detection timings of the vibrations by detecting the arrival of the vibration through detecting the fall (or the rise) of the vibration generated at the beginning of the arrival of the vibration, the sampling period is shortened greatly. Thus, the time of the preprocessing required for the command input can be shortened, thereby making it possible to improve the delay in the input processing.

While the selecting operation of the actually inputted hiragana character is done by an instruction selecting operation using the command key 9 or the touch panel 10 (step a41), specific explanations thereof will be omitted since it is an already known fact.

In the meantime, when the judgment result of step a37 turns out as true because the current value of the area identifying index k exceeds the range of "3" that is the total number of the areas of one finger while repeatedly executing the processing from step a35 to step a38, it means that there is no area k having the upper-limit value and the lower-limit value including the time difference t of the detection timing to be the analysis data detected even after searching the upper-limit values and the lower-limit values of all the areas of k=1 to 3, i.e., it means that the tapping operation is inappropriate. Thus, the microprocessor 3 functioning as the operation point identifying module G displays an error message on the display 8 of the PDA 2 and ends the input judgment processing (step a39), and returns to an initial standby state to wait for a vibration to be detected by any of the first detection modules A1-A4 and the second detection module B1 to stand by for a retry input of a tapping operation.

Second Exemplary Embodiment

Figure 20:
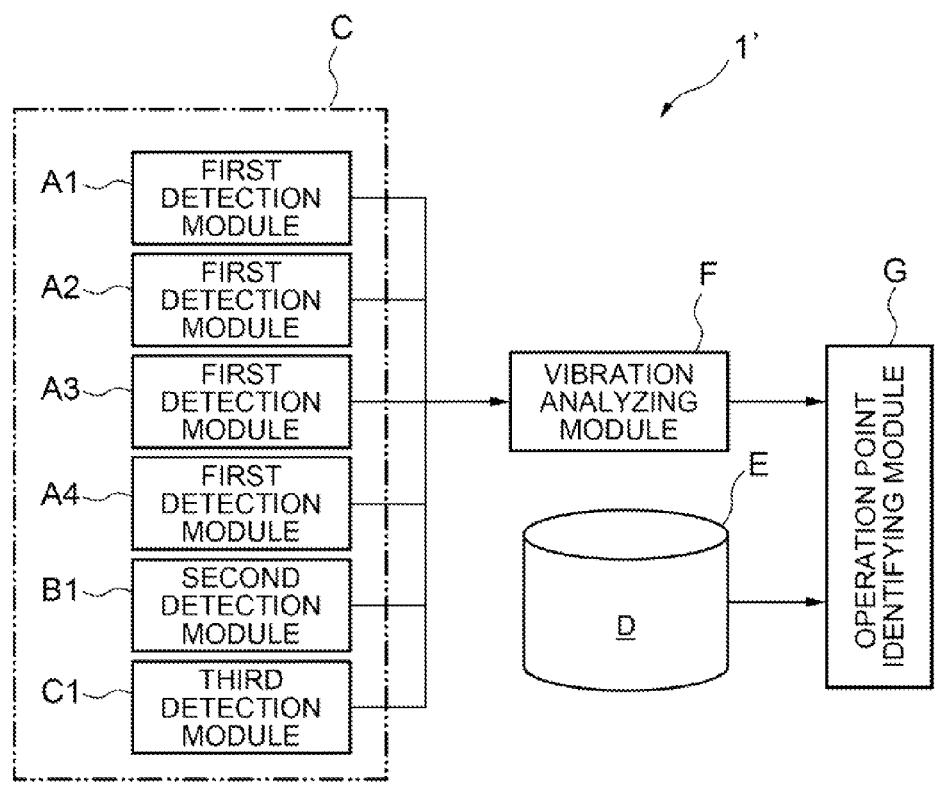
FIG. 20 is a functional block diagram showing the structure of a command input device according to another exemplary embodiment to which the present invention is applied.
Figure 21:
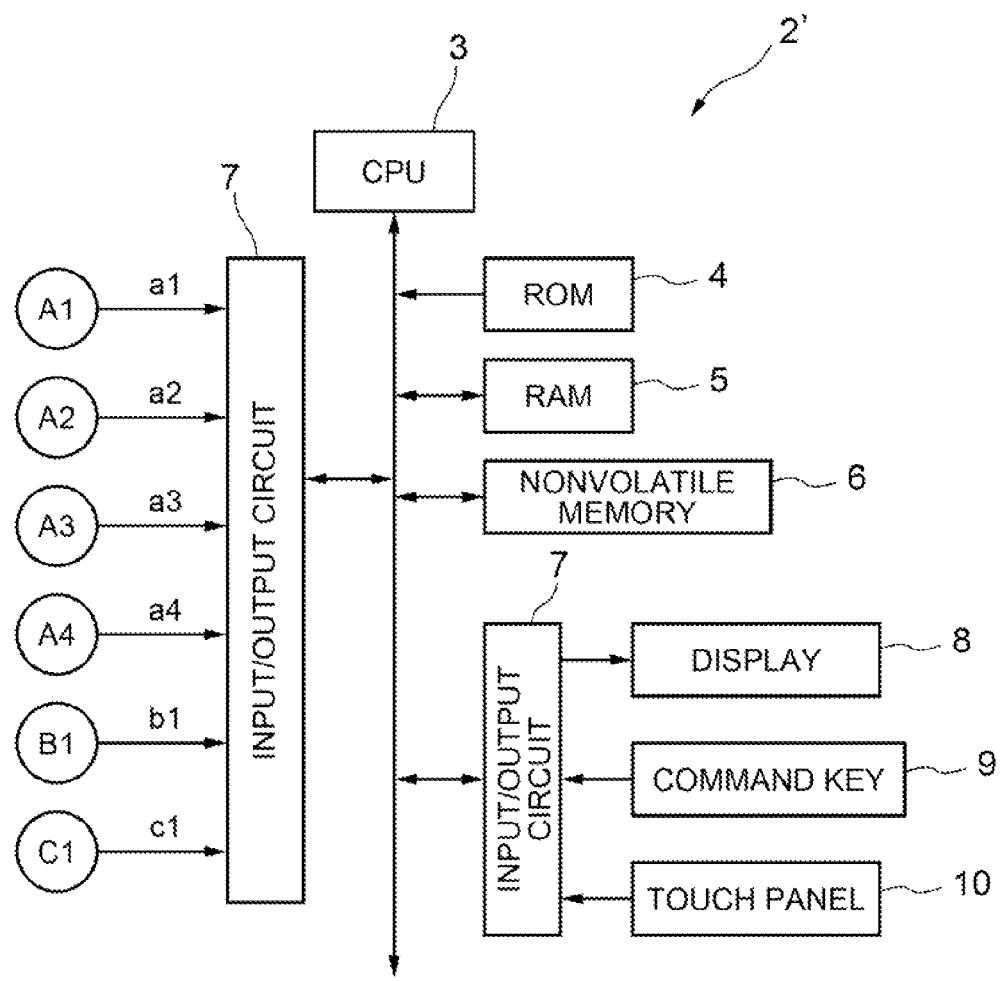
FIG. 21 is a block diagram showing an embodied structure of PDA (Personal Digital Assistants) to which the command input device of the exemplary embodiment is loaded.

FIG. 20 is a functional block diagram showing the structure of a command input device 1' according to another exemplary embodiment to which the present invention is applied. Further, FIG. 21 is a block diagram showing an embodied structure of PDA (Personal Digital Assistants) 2' to which the command input device 1' is loaded.

The structures of the main parts regarding the hardware of the command input device 1' and the PDA 2' are almost the same as those of the command input device 1 and the PDA 2 of the first exemplary embodiment described above, except that the command input device 1' of the exemplary embodiment includes a third detection module C1 for detecting vibrations transmitted inside the PDA 2' that also functions as a casing of the command input device 1', and that the third detection module C1 is connected to an input/output circuit 7 of the microprocessor 3 functioning as the vibration analyzing module F and the operation point identifying module G.

The third detection module C1 is constituted with an acceleration sensor or the like as in the case of the first detection modules A1-A4 and the second detection module B1, and a signal c1 outputted from the third detection module C1 is also read by the microprocessor 3 functioning as the vibration analyzing module F as in the case of the signals a1-a4 outputted from the first detection modules A1-A4 and the signal b1 outputted from the second detection module B1.

Further, in addition to a well-known control program required for achieving normal functions of the PDA 2', control programs (see FIG. 27-FIG. 28) peculiar to the exemplary embodiment required for functioning the microprocessor 3 of the PDA 2' as the vibration analyzing module F and the operation point identifying module G are stored in the ROM 4.

Figure 22:
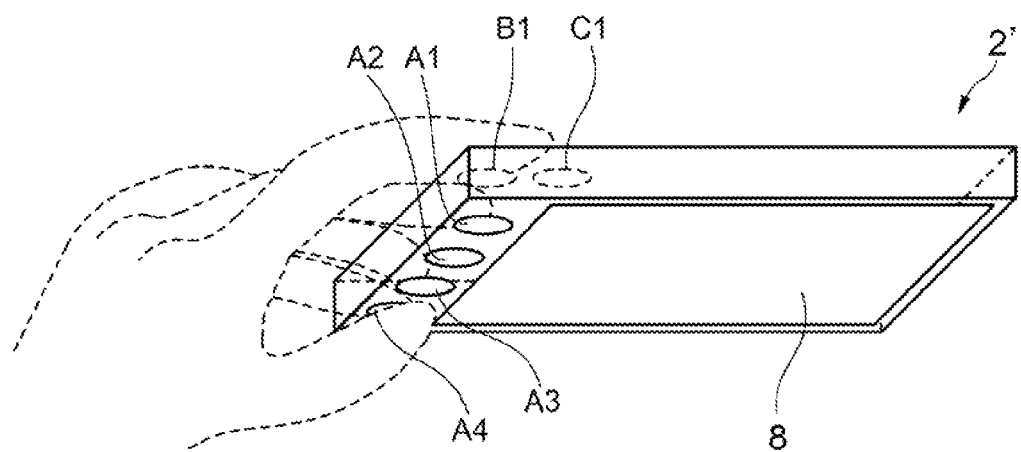
FIG. 22 is a perspective view taken from the front-face side of the PDA of the exemplary embodiment.

FIG. 22 is a perspective view taken from the front-face side of the PDA 2' to which the command input device 1' is loaded. As shown in FIG. 22, on the left side of the front face of the casing of the PDA 2' functioning also as the casing of the command input device 1', the first detection modules A1-A4 are disposed in a longitudinal sequence manner to be able to be selectively touched by the thumb as the body of the user. Further, the second detection module B1 is disposed on the back-face side of the casing of the PDA 2' in such a manner that one of the remaining four fingers such as the forefinger can be in contact therewith. The third detection module C1 is disposed on the back-face side of the casing at a position where the fingers and the body of the user cannot be in contact.

Therefore, in this case, the first detection point on the body of the user is the thumb, and the second detection point on the body of the user is the forefinger. To move the thumb to be in contact with one of the first detection modules A1-A4 is equivalent to selecting one of the terminal parts branched from the body of the user and setting it as the first detection point.

Figure 23:
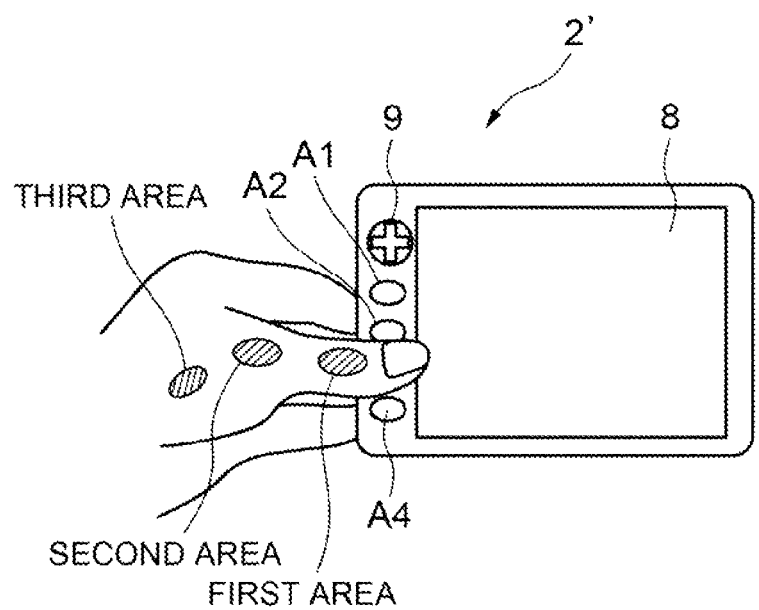
FIG. 23 is a conceptual illustration showing areas defined in the thumb as tapping points.

In this exemplary embodiment, as shown in FIG. 23, the section from the tip to the first joint of the thumb that selectively touches one of the first detection modules A1-A4 is defined as a first area, the section from the first joint of the thumb to the second joint as a second area, the section from the second joint of the thumb to the joint of the wrist as a third area, and no area as the tapping target is defined in the other four fingers. However, the first detection areas A1-A4 can be freely selected through changing the position of the thumb, so that the number of the combinations of the first detection modules and the areas is still "4×3=12" as in the case of the first exemplary embodiment described above.

Figure 24:
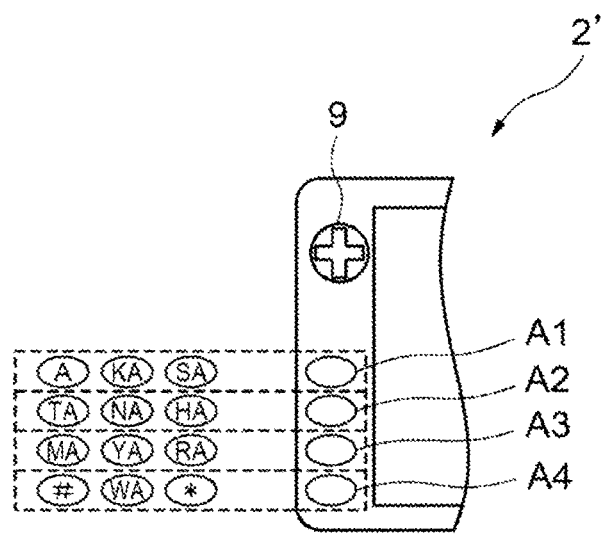
FIG. 24 is a model illustration regarding options corresponding to combinations of the first detection modules and the areas defined in the thumb.
Figure 25A:
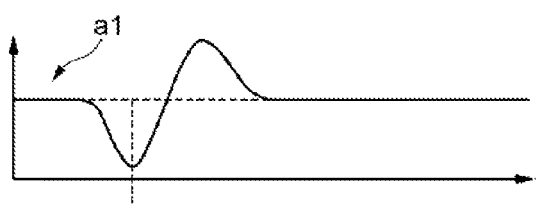
FIG. 25 shows charts regarding the operation principle regarding the corresponding relations of an output from the first detection module, an output from the second detection module, and an output from the third detection module on an assumption that an area in the thumb is tapped while the thumb is being in contact with the first detection module, in which (a) shows the output from the first detection module, (b) shows the output from the second detection module, (c) shows the output from the third detection module, and (d) shows a waveform when the output from the third detection module is subtracted from the output from the second detection module.
Figure 25B:
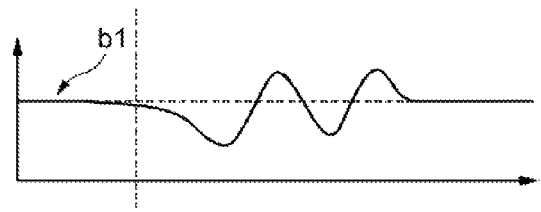
Figure 25C:
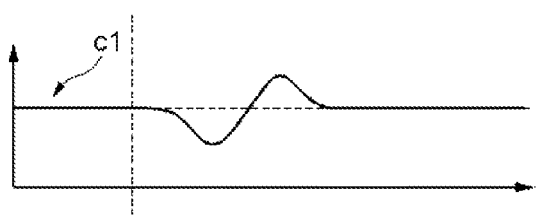
Figure 25D:
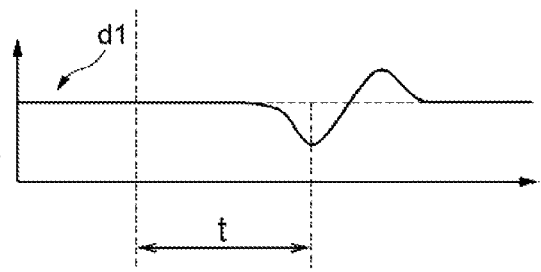

Twelve kinds of options of the hiragana characters corresponding to the combinations of the first detection modules A1-A4 and the three areas defined in the thumb are shown in a model illustration of FIG. 24. The contents shown in a table of FIG. 24 are merely a specific example of the options, and a note or the like with such table is not actually attached to the PDA 2'. Comparing the layout of "a", "ka", "sa"/"ta", "na", "ha"/"ma", "ya", "ra"/"*", "wa", "#" shown in FIG. 24 with the layout of "sa", "ka", "a"/"ha", "na", "ta"/"#", "wa", "*" in the definition shown in FIG. 4 of the first exemplary embodiment and the table TB 2 of FIG. 9, those seem like being inverted from each other to the left and right sides in the horizontal direction. However, the layout of the hiragana characters is shown on the basis of the back sides of the hand and fingers, i.e., the back-face side of the PDA 2, in the first exemplary embodiment, whereas the layout of the hiragana characters is shown on the basis of the front-face side of the PDA 2' in this exemplary embodiment. Thus, the actual layouts of the hiragana characters, i.e., the layouts of the hiragana characters from the viewpoint of the user, are the same in both cases. That is, the data of the table TB 2 as shown in FIG. 9 of the first exemplary embodiment described above can also be used directly in this exemplary embodiment. Actually, there are differences with respect to the first exemplary embodiment described above in respect that the structures, such as the bones, muscles, tendons, and joints of the thumb are different from those of the other four fingers and that the length of the forefinger that is to be the other vibration transmission path by being in contact with the second detection module B1 is long, etc., so that there is a difference generated in the vibration transmission required time compared to the case of the first exemplary embodiment described above. However, this is not a substantial difference, and it simply needs to correct the upper-limit values and the lower-limit values written in the table TB 2. Thus, it is to be understood that small differences regarding the contents of the data are to be ignored in the explanations provided hereinafter.

FIG. 25 is an operation principle chart showing the corresponding relation regarding the output a1 from the first detection module A1, the output b1 from the second detection module B1, and the output c1 from the third detection module C1 assuming that the first area of the thumb is being tapped while the thumb is in contact with the first detection module A1. Specifically, (a) of FIG. 25 shows the output a1 from the first detection module A1, (b) of FIG. 25 shows the output b1 from the second detection module B1, and (c) of FIG. 25 shows the output c1 from the third detection module C1.

Figure 26:
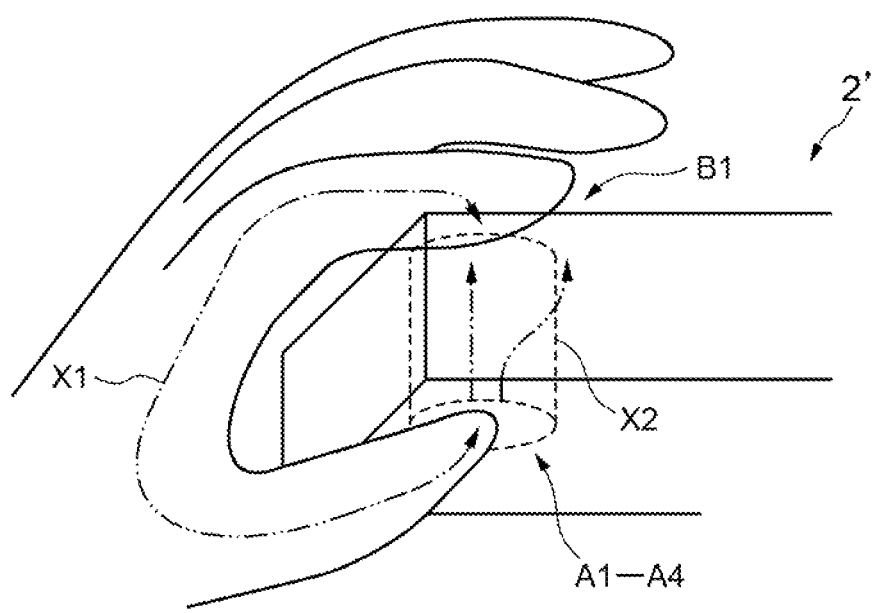
FIG. 26 is a conceptual illustration showing associations between a human body vibration transmission path X1 that transmits the vibration inside the body and a casing-side vibration transmission path X2 that transmits the vibration inside the casing.

In this exemplary embodiment, as shown in FIG. 26, the first detection modules A1-A4 and the second detection module B1 detect the vibrations along the coaxial directions, so that there are a casing-side vibration transmission path X2 for transmitting the vibration inside the casing in addition to a body-side vibration transmission path X1 for transmitting the vibration inside the body. As a result, the second detection module B1 detects the synthesized vibration of the two vibration transmission paths X1 and X2, so that a waveform for specifying the vibration arrival time cannot be acquired appropriately. Therefore, in this exemplary embodiment, an external disturbance eliminating function of the vibration analyzing module F is utilized to subtract the data of the vibration detected by the third detection module C1, i.e., the data regarding only the casing-side vibration transmission path X2 that does not contain the influence of the body-side vibration transmission path X1, from the data of the vibration detected by the second detection module B1 to eliminate the influence of the vibration transmitted through the casing-side vibration transmission path X2 from the vibration detected by the second detection module B1, acquire the vibration data corresponding to the vibration from the body-side vibration transmission path X1 that transmits the vibration inside the body, i.e., the data that is originally supposed to be extracted by the second detection module B1, and analyze the association between the acquired data and the vibration data a1-a4 (actually one of those) detected by the first detection modules A1-A4 (actually one of those) to calculate the time difference regarding the detection timings to be the analysis data.

Figure 27:
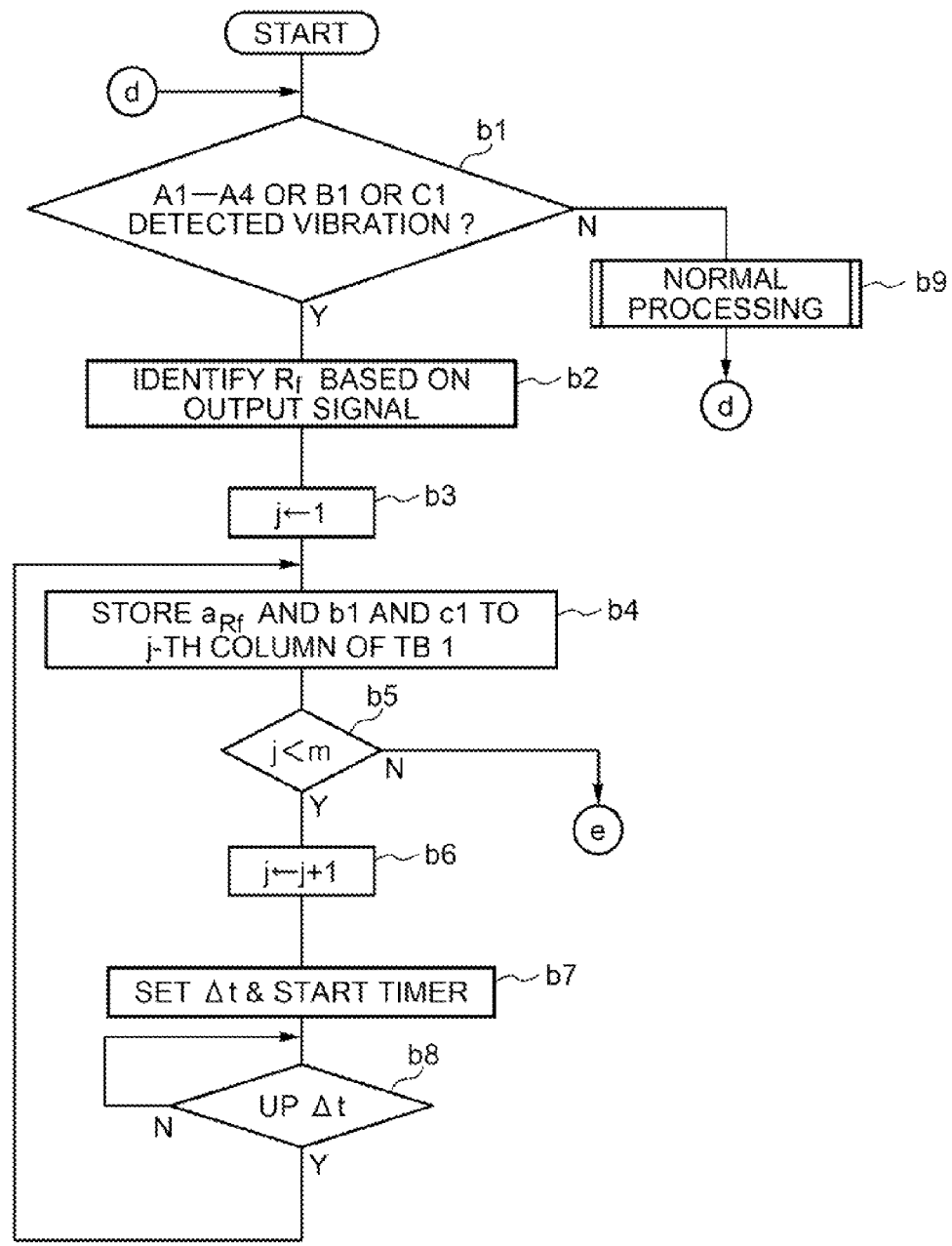
FIG. 27 is a flowchart showing the outline of processing actions of a microprocessor that functions as a vibration analyzing module and an operation point identifying module.
Figure 28:
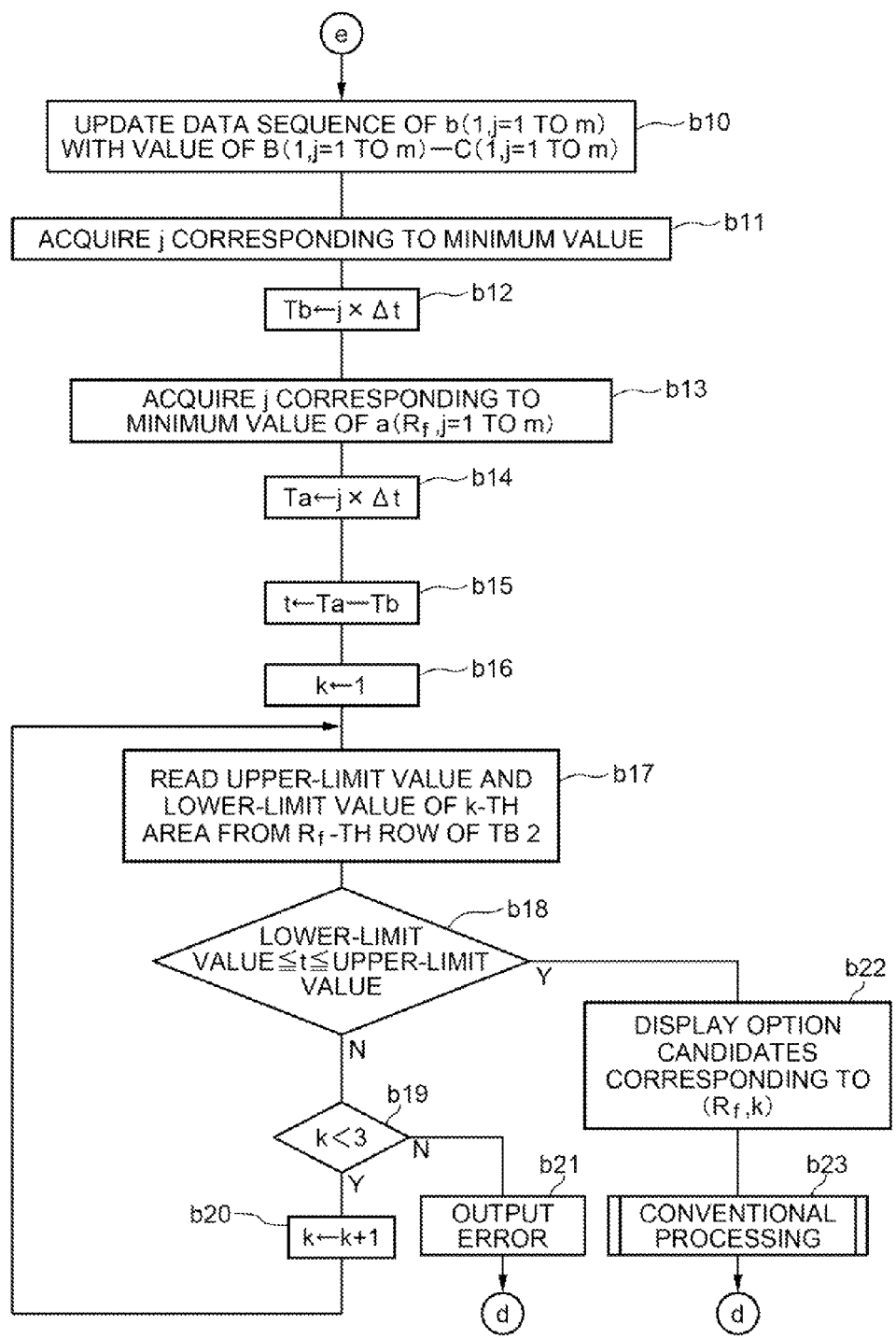
FIG. 28 is a flowchart showing the outline of following processing actions of the microprocessor that functions as the vibration analyzing module and the operation point identifying module.

FIG. 27-FIG. 28 are flowcharts showing the outline of processing actions of the microprocessor 3 functioning as the vibration analyzing module F and the operation point specifying module G of the command input device 1'.

Next, the processing actions (referred to as input judgment processing hereinafter) of the microprocessor 3 that functions as the vibration analyzing module F and the operation point specifying module G will be described specifically by referring to FIG. 27-FIG. 28.

There are many aspects that are in common to the processing of the first exemplary embodiment shown in FIG. 10-FIG. 12, so that only the processing operation different from the above-described first exemplary embodiment will be described in detail by referring to FIG. 27-FIG. 28.

The microprocessor 3 upon starting the input judgment processing first judges whether or not a vibration is detected by any of the first detection modules A1-A4, the second detection module B1, and the third detection module C1 (step b1).

When the vibration is not detected by any of the first detection modules A1-A4, the second detection module B1, and the third detection module C1, it means that there is no tapping operation made by the user on the thumb. Thus, the microprocessor 3 executes processing regarding the basic functions of the PDA 2' as in conventional cases (step b9), and ends the input judgment processing of this period. When the tapping operation by the user is not detected, only the judgment processing of step b1 and the processing of step b9 are repeatedly executed. Thus, the PDA 2' functions in the same manner as that of the conventional PDA.

In the meantime, when the user executes a tapping operation on the thumb and taps one of the areas out of the first areas, the second areas, and the third areas of the thumb by the hand that is not holding the PDA 2', a first vibration is detected by one of the first detection modules A1-A4, the second detection module B1, or the third detection module C1 (step b1).

When it is confirmed that the first vibration is detected by any of the first detection modules A1-A4, the second detection module B1, or the third detection module C1, the microprocessor 3 functioning as an each-detection-module operation point identifying function achieving module of the operation point identifying module G refers to the input state of signals from the first detection modules A1-A4 to judge from which of the detection modules A1-A4 the vibration signal is inputted, i.e., to which of the first detection modules the thumb of the user is touching, and sets the value corresponding to the first detection module that inputs the vibration signal to a first detection module identifying index Rf (step b2). The value set to the first detection module identifying index Rf is "1" when the vibration signal from the first detection module A1 is inputted, the value set to the first detection module identifying index Rf is "2" when the vibration signal from the first detection module A2 is inputted, the values set to the first detection module identifying index Rf is "3" when the vibration signal from the first detection module A3 is inputted, and the value set to the first detection module identifying index Rf is "4" when the vibration signal from the first detection module A4 is inputted.

In this exemplary embodiment, there is only one first detection module that is actually in contact with the thumb out of the first detection modules A1-A4 unlike the case of the first exemplary embodiment described above. Thus, it is easy to identify the first detection module that is actually in contact with the thumb through executing a processing operation such as monitoring the input state of the vibration signals of the first detection modules A1-A4.

Then, the microprocessor 3 sets an initial value "1" to a writing position identifying index j which identifies the column of the sampling data storage table TB 1 generated within the RAM 5 for storing sampling data (step b3), reads a current value $a_{Rf}$ of the signal outputted from a first detection module $A_{Rf}$ identified by the first detection module identifying index Rf, i.e., the first detection module to which the thumb is actually in contact, a current value b1 of the signal outputted from the second detection module B1, and a current value c1 of the signal outputted from the third detection module C1, and writes those values $a_{Rf}$, b1, and c1 to the j-th column of the sampling data storage table TB 1 as shown in FIG. 15 based on the current value of the wiring position identifying index j (step b4). While it is so illustrated in FIG. 15 that the data can be stored in parallel for five rows in the sampling data storage table TB 1, the number of rows actually required for storing the data in this exemplary embodiment are three rows.

Then, the microprocessor 3 judges whether or not the current value of the writing position identifying index j is within a range of sampling number m set in advance (step b5). When the current value of the writing position identifying index j is within the range of sampling number m set in advance, the microprocessor 3 increments the value of the writing position identifying index j by "1" (step b6), and sets a sampling period Δt to a sampling timer and starts the timer (step b7).

Further, the microprocessor 3 stands by until the sampling timer counts the sampling period Δt (step b8). When it is confirmed that the set sampling period Δt has passed, the microprocessor 3 shifts to the processing of step b4 again, and repeatedly executes the processing operation of step b4-step b8 in the same manner as described above.

Therefore, the sampling processing of the period Δt is started at the point where the first vibration is detected by one of the first detection modules A1-A4, the second detection module B1, or the third detection module C1. In the sampling data storage table TB 1, m-numbers each of the signals of the vibrations outputted from the first detection module $A_{Rf}$ to which the thumb is actually in contact, the second detection module B1, and the third detection module C1 are stored in a time series manner, i.e., over the sampling period of Δt·m in terms of time. These can be expressed as a time series graph that is equivalent to the charts shown in (a), (b), and (c) of FIG. 25, for example. In (a) of FIG. 25, the value of the first detection module identifying index Rf is assumed as "1". However, when the value of the first detection module identifying index Rf is "2" and the thumb is in contact with the first detection module A2, the vibration data shown in (a) of FIG. 25 becomes the output a2 from the first detection module A2. Further, when the value of the first detection module identifying index Rf is "3" and the thumb is in contact with the first detection module A3, the vibration data shown in (a) of FIG. 25 becomes the output a3 from the first detection module A3. In the meantime, the value of the first detection module identifying index Rf is "4" and the thumb is in contact with the first detection module A4, the vibration data shown in (a) of FIG. 25 becomes the output a4 from the first detection module A4.

Further, when it is confirmed by the judgment processing executed in step b5 that the current value of the writing position identifying index j has reached the sampling number m set in advance, the microprocessor 3 functioning as the external disturbance eliminating function achieving module of the vibration analyzing module F reads all of a series of sampling data b(1, 1)-b(1, m) regarding the vibration detected by the second detection module B1 and a series of sampling data c(1, 1)-c(1, m) regarding the vibration detected by the third detection module C1, subtracts the value of the sampling data c(1, j) from the value of the sampling data b(1, j) for each of corresponding sampling period j (where "j=1 to m") to acquire the value d(1, j) of the vibration data that is originally supposed to be extracted by the second detection module B1, and updates the value of the sampling data b(1, j) with the value of d(1, j) (step b10).

The processing operation is equivalent to the processing executed for subtracting the output c1 of the third detection module C1 shown in (c) of FIG. 25 from the output b1 of the second detection module B1 shown in (b) of FIG. 25. Through this processing operation, the influence of the vibration from the above-described casing-side vibration transmission path X2 is eliminated, thereby making it possible to properly acquire the vibration data corresponding to the vibration from the body-side vibration transmission path X1 that transmits the vibration inside the body, the data d(1, j) that is originally supposed to be extracted by the second detection module B1. That is, it is possible to acquire the chart shown in (d) of FIG. 25 by plotting the data of d(1, j) over "i=1 to m" at the sampling period Δt.

In this exemplary embodiment, the value of d(1, j) is overwritten on the value of the sampling data b(1, j) for saving the memory. However, if there is no limitation set in the memory, the sampling data b(1, j) may also be saved along with the data d(1, j) that is originally supposed to be extracted by the second detection module B1.

Then, the microprocessor 3 functioning as the vibration analyzing module F acquires the value j of the number of sampling times corresponding to the detection point of the first minimum value by searching in order the values of the data d(1, j) from the side of "j=1", i.e., from the point immediately after the start of the sampling processing (step b11). Further, the microprocessor 3 acquires the generation time of the first minimum value by having the point at which the first vibration is detected as the start point through multiplying the value j of the number of sampling times by the sampling period Δt, and stores the time to a second-detection-module minimum value generation time storage register Tb (step b12).

Further, the microprocessor 3 functioning as the vibration analyzing module F reads all of a series of sampling data a(Rf, 1)-a(Rf, m) regarding the vibration detected by the first detection module A1 $A_{Rf}$ that is in contact with the tapped thumb, and acquires the value j of the number of sampling times corresponding to the detection point of the first minimum value by searching values of the data a(Rf, j) from the side of "j=1" (step b13). Further, the microprocessor 3 acquires the generation time of the first minimum value by having the point at which the first vibration is detected as the start point through multiplying the value j of the number of sampling times by the sampling period Δt, and stores the time to a first-detection-module minimum value generation time storage register Ta (step b14).

Then, the microprocessor 3 functioning as the vibration analyzing module F subtracts the value of the second-detection-module minimum value generation time storage register Tb from the value of the first-detection-module minimum value generation time storage register Ta to calculate the time difference regarding the detection timings between the detection time of the vibration by the first detection module $A_{Rf}$ that is actually in contact with the tapped thumb and the vibration detection time on d(1, 1) that is the data originally supposed to be extracted by the second detection module B1, and stores the value to the analysis data storage register t as the analysis data that is acquired by analyzing the association between the vibrations detected by the first detection module $A_{Rf}$ and the second detection module B1 (step b15). An example of the time difference t regarding the detection timings is shown in the chart of FIG. 25.

Note here that the time difference t regarding the detection timings can be acquired on the basis of the fall of the vibration or the threshold value instead of the minimum value as in the case of the first exemplary embodiment.

Then, the microprocessor 3 functioning as the operation point identifying module G sets an initial value "1" to an area identifying index k for identifying the actually tapped area (step b16), reads values of the upper-limit value and lower-limit value of the k-th area from a data sequence of the Rf-th row, i.e., from a data sequence corresponding to the first detection module $A_{Rf}$ corresponding to the actually tapped finger, based on the current value of the index k from the table TB 2 as shown in FIG. 9 functioning as the database that stores the corresponding relation of the upper-limit values and the lower-limit values required for judging the areas (step b17), and judges whether or not the time difference t regarding the detection timings between the first detection module $A_{Rf}$ and the second detection module B1 calculated in the processing of step b15 is included between the upper-limit value and the lower-limit value of the k-th area (step b18).

When the detection timing difference t as the analysis data is not included between the upper-limit value and the lower-limit value of the k-th area, the microprocessor 3 functioning as the operation point identifying module G judges whether or not the current value of the index k is within the range of "3" that is the total number of the areas of the thumb as one finger (step b19). Then, when the current value of the index k is within the range of "3" that is the total number of the areas of the thumb as one finger, the microprocessor 3 functioning as the operation point identifying module G increments the value of the index k by "1" again (step b20), reads the values of the upper-limit value and the lower-limit value of the k-th area again from the data sequence of the Rf-th row of the table TB 2 as shown in FIG. 9 based on the current value of the updated index k (step b17), and again judges whether or not the time difference t of the detection timings is included between the upper-limit value and the lower-limit value of the k-th area (step b18).

When the judgment result of step b18 becomes true because the area k having the upper-limit value and the lower-limit value sandwiching the detection timing difference t therebetween is detected while the processing from step b17 to step b20 is repeatedly executed, it means that the tapping operation is conducted on the k-th area of the thumb that is in contact with the first detection module $A_{Rf}$. Thus, the microprocessor 3 functioning as the each-detection-module operation point identifying function achieving module of the operation point identifying module G identifies that the tapping operation is conducted on the thumb that is in contact with the first detection module $A_{Rf}$ and that the tapping operation is conducted in the k-th area of the thumb, and displays options of command input corresponding to the arrangement (Rf, k) that shows the combination of the first detection module or the finger and the area that is the tapping operation point on the display 8 of the PDA 2' (step b22).

The processing of step b22 to step b23 is the same processing as that of step a40 to step a41 of the first exemplary embodiment described above, so that explanations thereof are omitted.

In the meantime, when the judgment result of step b19 turns out as true because the current value of the area identifying index k exceeds the range of "3" that is the total number of the areas of the thumb as one finger while repeatedly executing the processing from step b17 to step b20, it means that there is no area k having the upper-limit value and the lower-limit value including the time difference t of the detection timing to be the analysis data detected even after searching the upper-limit values and the lower-limit values of all the areas of k=1 to 3, i.e., it means that the tapping operation is inappropriate. Thus, the microprocessor 3 functioning as the operation point identifying module G displays an error message on the display 8 of the PDA 2' and ends the input judgment processing (step b21), and returns to an initial standby state to wait for a vibration to be detected by one of the first detection modules A1-A4, the second detection module B1, or the third detection module C1 to stand by for a retry input of a tapping operation.

While the case of loading the command input device 1' to a card-size terminal such as the PDA 2' is described in this exemplary embodiment, the terminal is not limited only to the card type.

Figure 29:
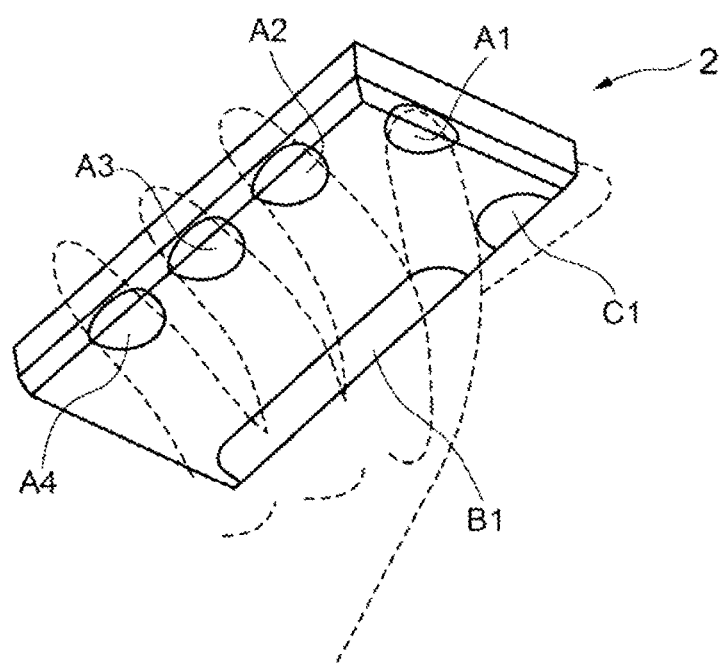
FIG. 29 is a simplified illustration of an example where the command input device of the exemplary embodiment is loaded to a mobile information device in which the first detection modules and the second detection module are placed by opposing to each other on the left and right side faces and the like of the casing.

The external disturbance eliminating function achieved by utilizing the third detection module C1 as the feature of this exemplary embodiment can also be employed to the PDA 2 shown in FIG. 29, i.e., a mobile information device in which the first detection modules A1-A4 and the second detection module B4 are disposed by opposing to each other on the left and right side faces or the like of the casing. The first detection modules A1-A4 and the second detection module B1 are to detect the vibrations in the coaxial directions also in the structure shown in FIG. 29. Thus, as in the above-described case, it is possible to subtract the vibration transmitting through the inside the casing and extract only the body vibration property through placing the third detection module C at a position that is in the vicinity of the second detection module B1 and a position where a part of the body holding the casing does not make a contact and through performing the same processing operation as the above-described case.

Further, the exemplary embodiment can also be used in combinations with a method of passively attenuating the vibration transmitting through the casing-side vibration transmission path X2 as shown in FIG. 26 by using an anti-vibration member as the part for fixing the casing with the acceleration sensors that constitute the first and second detection modules A1-A4 and B1, such as the anti-vibration member 13*a* of the wiring board shown in FIG. 14.

Third Exemplary Embodiment

Figure 30:
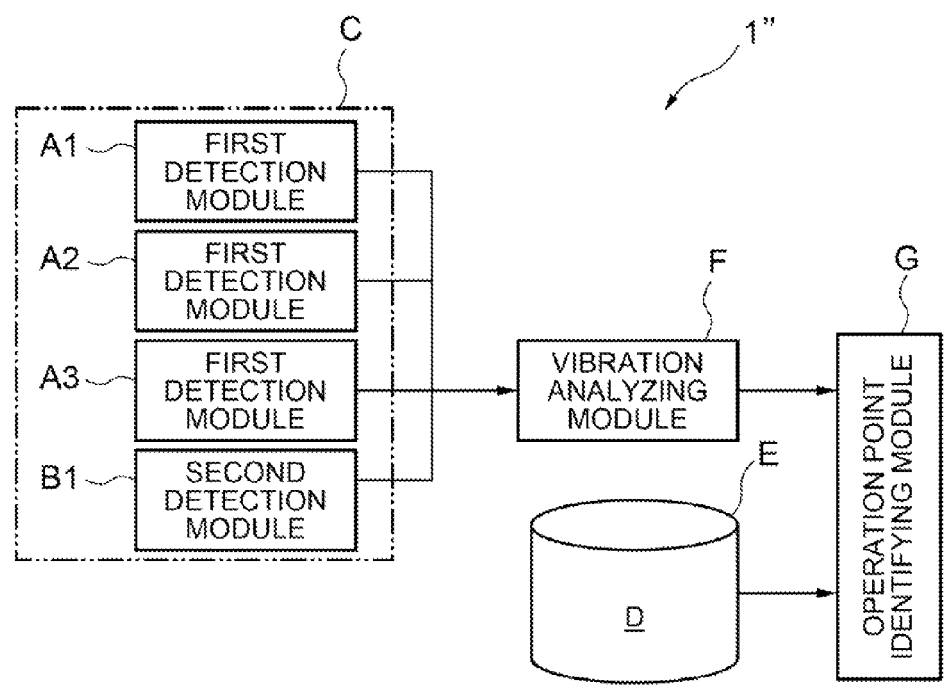
FIG. 30 is a functional block diagram showing the structure of a command input device according to still another exemplary embodiment to which the present invention is applied.
Figure 31:
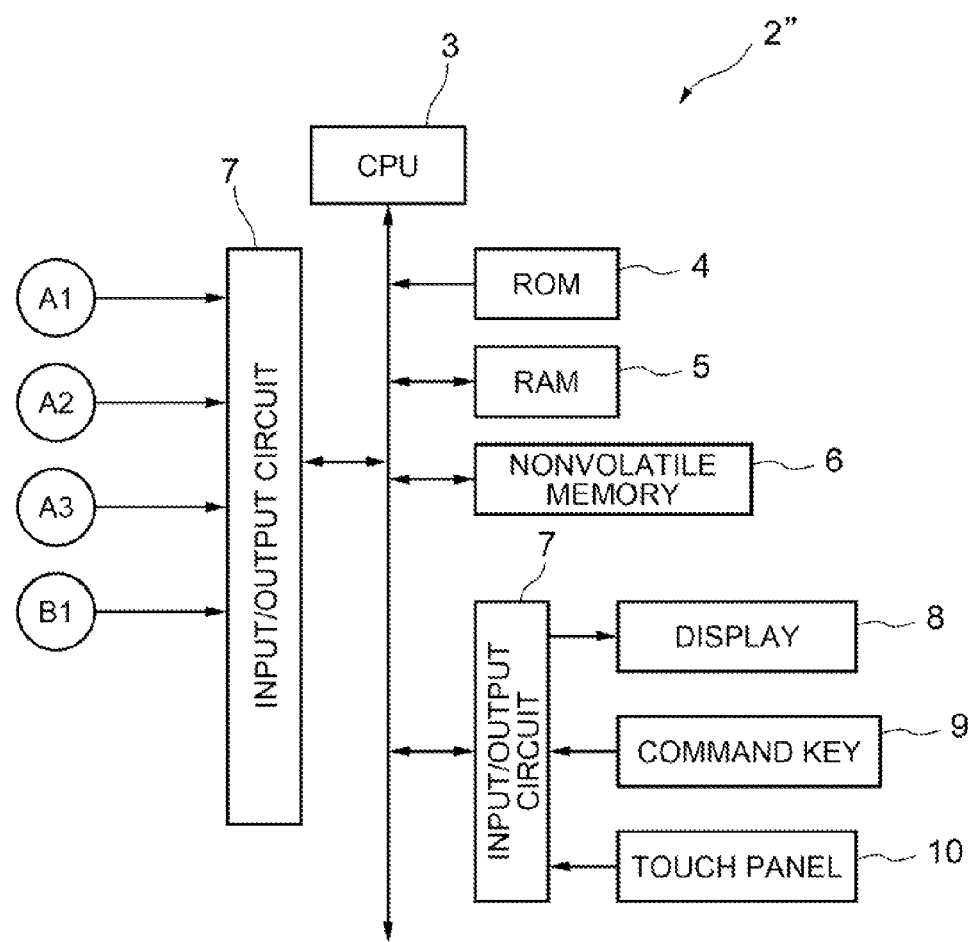
FIG. 31 is a block diagram showing an embodied structure of PDA (Personal Digital Assistants) to which the command input device of the exemplary embodiment is loaded.

FIG. 30 is a functional block diagram showing the structure of a command input device 1" according to still another exemplary embodiment to which the present invention is applied. Further, FIG. 31 is a block diagram showing an embodied structure of PDA (Personal Digital Assistants) 2" to which the command input device 1" is loaded. Furthermore, FIG. 32 shows illustrations of the external appearance of the PDA 2" to which the command input device 1" is loaded and the providing state of the first detection modules A1-A4 and the second detection module B1 in the PDA 2".

Except that there are three first detection modules provided therein, the structures of the main parts regarding the hardware of the command input device 1" and the PDA 2" are almost the same as those of the command input device 1 and the PDA 2 of the first exemplary embodiment described above. However, the structure of the casing of the PDA 2" and the providing state of the first detection modules A1-A3 and the second detection module B1 in the command input device 1" and the PDA 2" are largely different from those of the first and second exemplary embodiments described above.

Figure 32A:
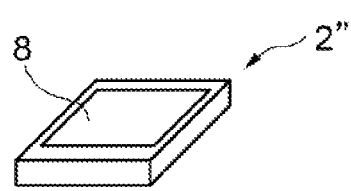

The PDA 2" is a slide-type PDA, and it is constituted with a main body part 14 having a display 8, and a frame part 15 to which the main body part 14 is fitted. FIG. 32A shows the folded state of the PDA 2", and FIG. 32B shows the opened state of the PDA 2".

Figure 32B:
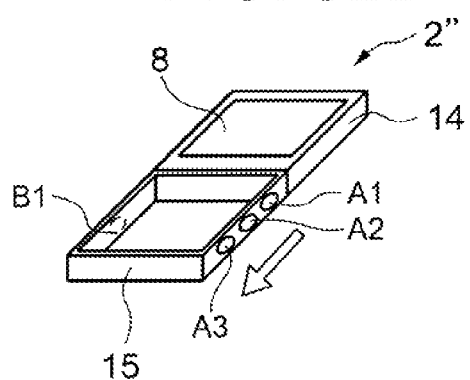

The frame part 15 can be pulled out from the main body part 14 as shown in FIG. 32B. The first detection modules A1-A3 constituted with the acceleration sensors and the like are disposed in a longitudinal sequence manner on the right-side face of the frame part 15 to be in contact with each of the end parts branched from the body of the user, specifically to be in contact with the middle finger, the forefinger, and the little finger of the hand that holds the PDA 2". Further, the second detection module B1 constituted with the acceleration sensor and the like is disposed on the left-side face of the frame part 15 to be in contact with the part of the body of the user connected to the base parts of the end parts, specifically to be in contact with the palm bottom part of the hand that holds the PDA 2".

Therefore, in this case, the first detection points on the user body are three fingers, i.e., the middle finger, the forefinger, and the little finger, and the second detection point on the user body is the palm bottom part.

Further, in addition to a well-known control program required for achieving normal functions of the PDA 2", control programs (see FIG. 34-FIG. 36) peculiar to the exemplary embodiment required for functioning the microprocessor 3 of the PDA 2" as the vibration analyzing module F and the operation point identifying module G are stored in the ROM 4.

Figure 32C:
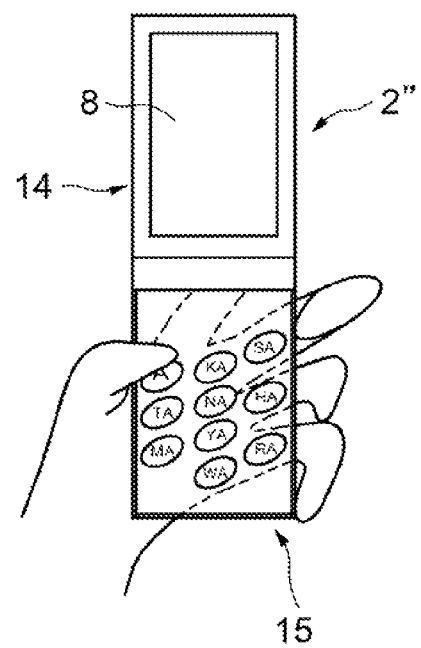

In this exemplary embodiment, as shown in FIG. 32C, areas to be the tapping targets are defined in ten points on the back of the hand, irrelevant to the middle finger, the forefinger, and the little finger that are to be in contact with the first detection modules A1-A3 as well as the palm bottom part that is in contact with the second detection module B1. Here, assuming the case of hiragana character input, ten areas are defined in order of "a", "ka", "sa"/"ta", "na", "ha"/"ma", "ya"/"ra", "wa" as in the cases of the first and second exemplary embodiments.

Unlike the cases of the first and second exemplary embodiments, the areas to be the tapping targets are not arranged along the fingers but the layout thereof is irregular.

Thus, in this exemplary embodiment, it is difficult to specify the areas to be tapped by employing the method which identifies the tapped finger and then identifies the area of that finger where the tapping operation is conducted (see the first exemplary embodiment) and the method which identifies the first detection module to which the thumb is in contact and then identifies the area of the thumb where the tapping operation is conducted (see the second exemplary embodiment).

Thus, in this exemplary embodiment, the corresponding relation regarding the areas and the combinations of the analysis data acquired by analyzing the association regarding the vibrations detected by the first detection modules A1-A3 and the vibration detected by the second detection module B1 is stored in a database E of a judgment data storage module D, specifically in a table TB 3 generated inside the ROM 4 of the PDA 2", the combination of the analysis data is acquired by analyzing the association regarding the vibrations detected by the first detection modules A1-A3 and the vibration detected by the second detection module B1 every time a tapping operation is conducted, and the table TB 3 is searched based on the combination of the analysis data to identify the point, i.e., the area, of the tapping operation made on the body of the user. Further, for the structure of the analysis data, the time difference regarding the detection timings of the vibration detected by the first detection modules and the vibration detected by the second detection module is utilized as in the cases of the first and second exemplary embodiments described above.

A specific example of the table TB 3 constituting the database E is shown in FIG. 33. For example, if the value of time difference t1 (analysis data) regarding the detection timings of the vibration detected by the first detection module. A1 and the vibration detected by the second detection module B1 is within a range of –0.025 to –0.20, the value of time difference t2 (analysis data) regarding the detection timings of the vibration detected by the first detection module A2 and the vibration detected by the second detection module B1 is within a range of –0.020 to –0.015, and the value of time difference t3 (analysis data) regarding the detection timings of the vibration detected by the first detection module A3 and the vibration detected by the second detection module B1 is within a range of –0.013 to –0.009 when a tapping operation is conducted, it means that the area tapped at this time is the area of "so" row of the hiragana characters having the options of "sa", "si", "su", "se", and "so". Further, on an assumption that the value of time difference t1 (analysis data) regarding the detection timings of the vibration detected by the first detection module A1 and the vibration detected by the second detection module B1 is within a range of 0.010 to 0.020, the value of time difference t2 (analysis data) regarding the detection timings of the vibration detected by the first detection module A2 and the vibration detected by the second detection module B1 is within a range of 0.007 to 0.013, and the value of time difference t3 (analysis data) regarding the detection timings of the vibration detected by the first detection module A3 and the vibration detected by the second detection module B1 is within a range of 0.010 to 0.020 when a tapping operation is conducted, it means that the area tapped at this time is the area of "ta" row of the hiragana characters having the options of "ta", "ti", "tu, "te", and "to".

The table TB 3 stores the already-known corresponding relation between the association of each of the detected vibrations and the tapping operation points made on the body of the user.

Figure 34:
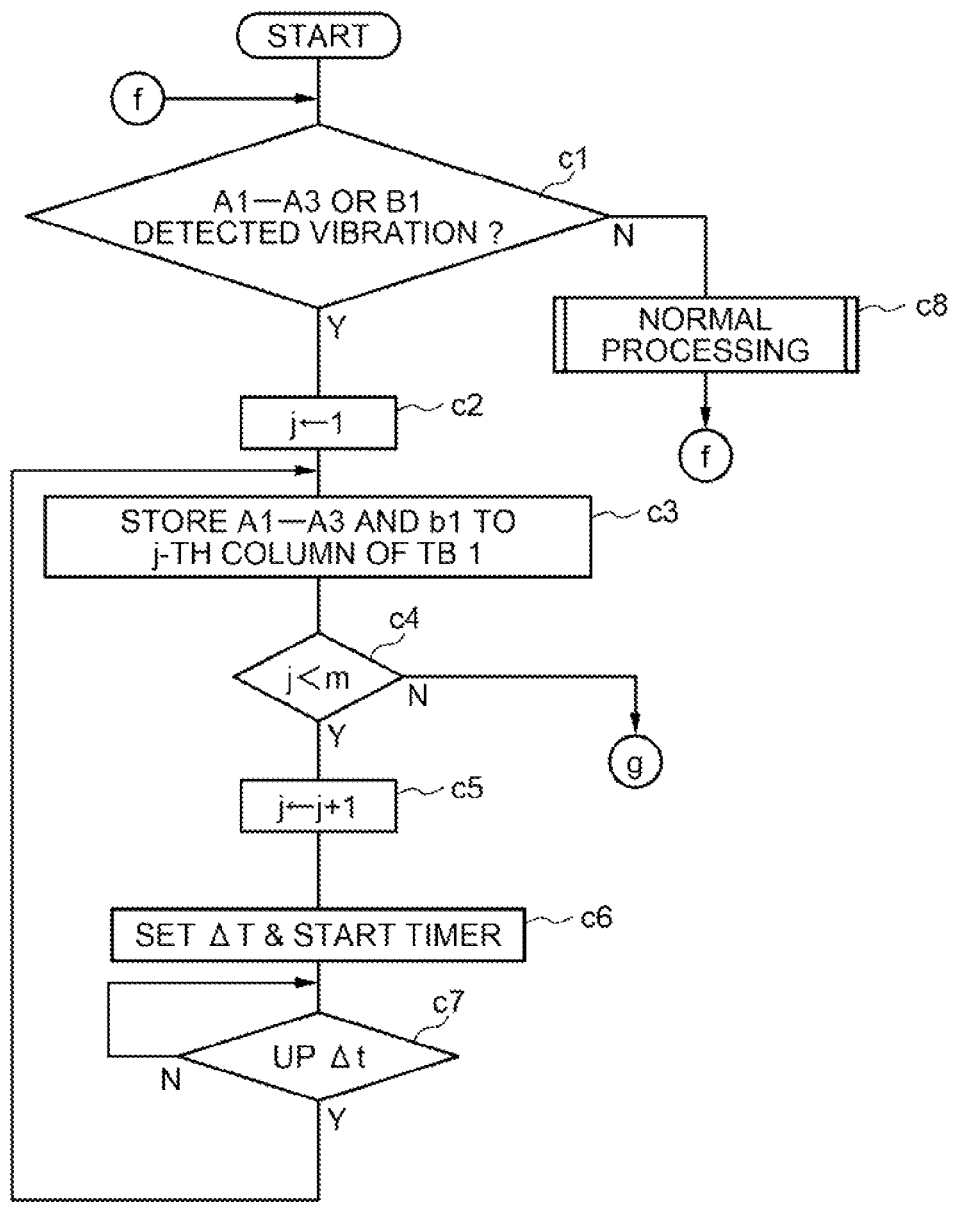
FIG. 34 is a flowchart showing the outline of processing actions of a microprocessor that functions as a vibration analyzing module and an operation point identifying module.
Figure 35:
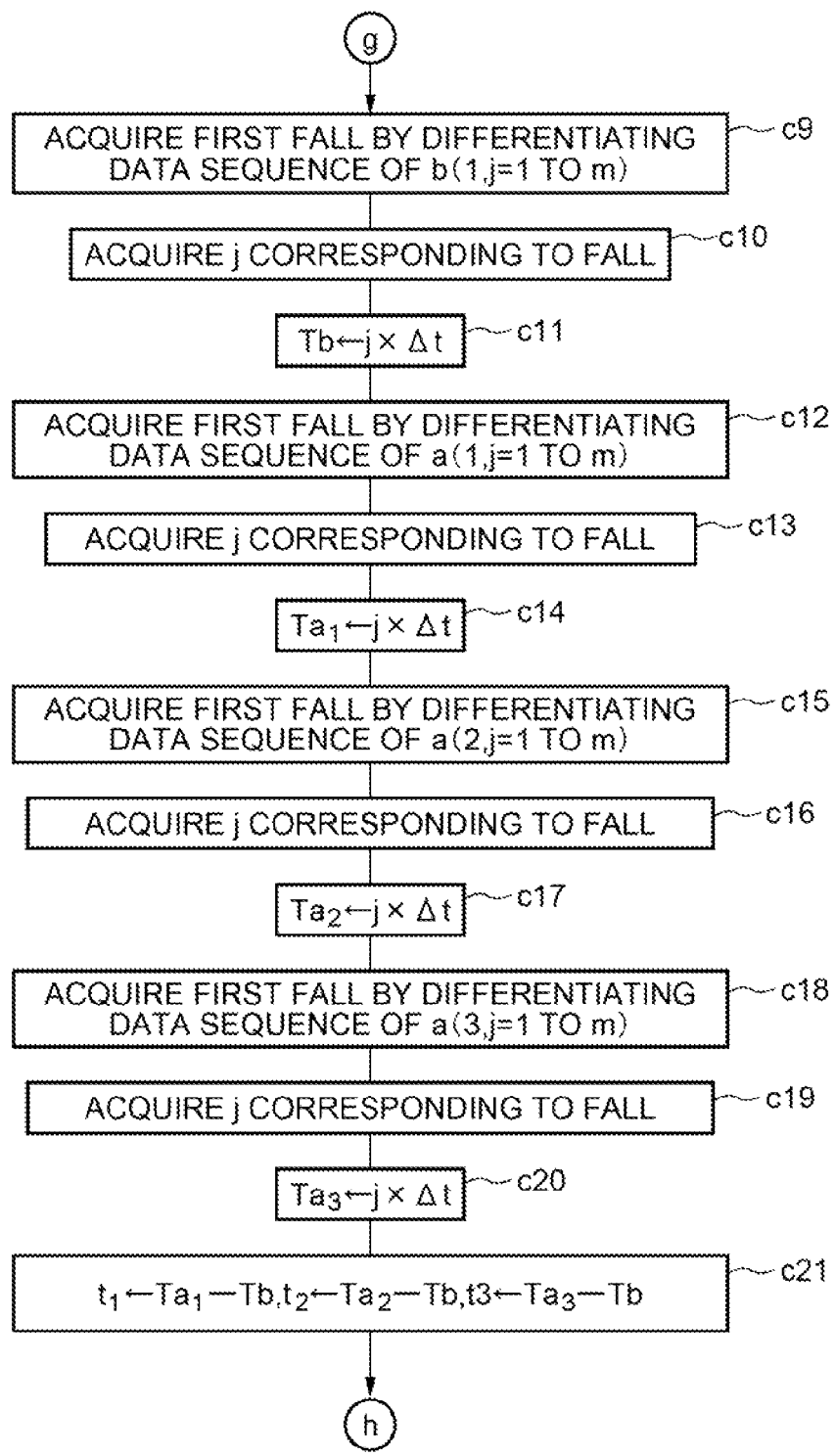
FIG. 35 is a flowchart showing the outline of following processing actions of the microprocessor that functions as the vibration analyzing module and the operation point identifying module.
Figure 36:
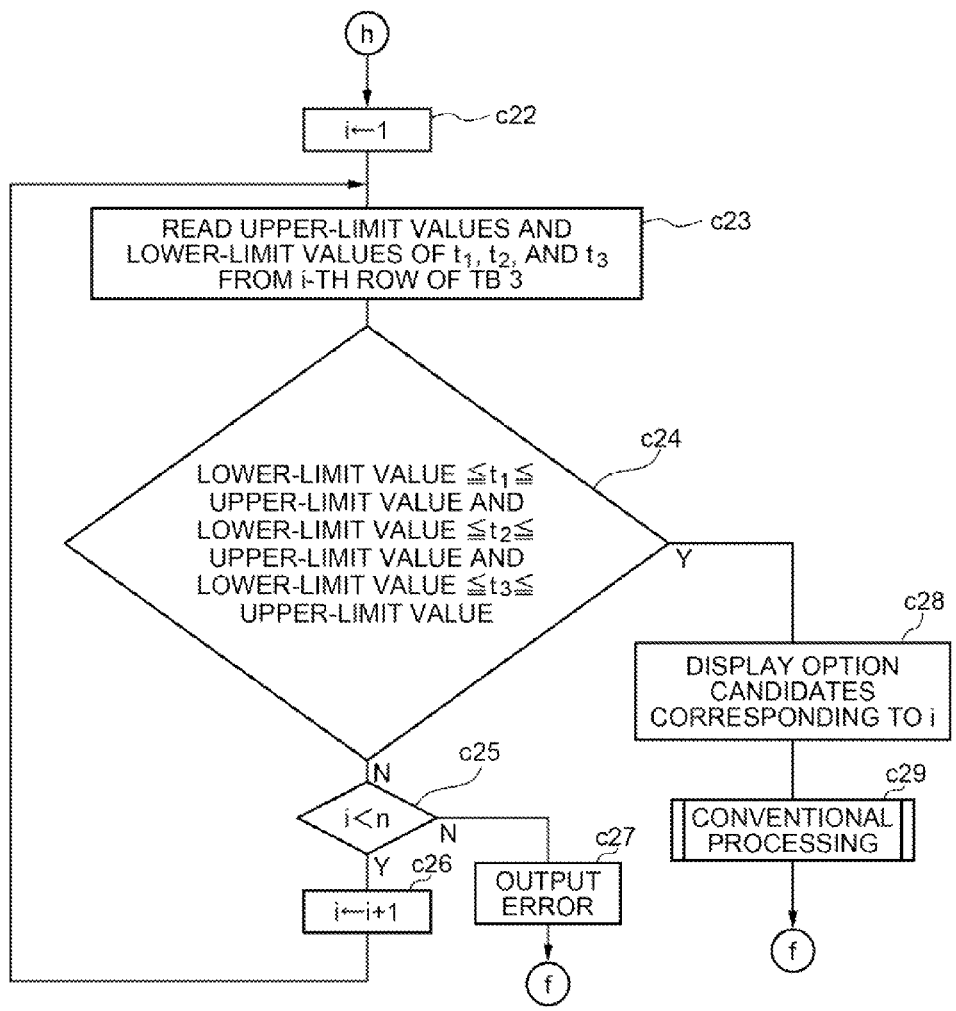
FIG. 36 is a flowchart showing the outline of following processing actions of the microprocessor that functions as the vibration analyzing module and the operation point identifying module.

FIG. 34-FIG. 36 are flowcharts showing the outline of processing actions of the microprocessor 3 functioning as the vibration analyzing module F and the operation point specifying module G of the command input device 1".

Next, the processing actions (referred to as input judgment processing hereinafter) of the microprocessor 3 that functions as the vibration analyzing module F and the operation point specifying module G will be described specifically by referring to FIG. 34-FIG. 36.

There are many aspects that are in common to the processing of the first exemplary embodiment shown in FIG. 10-FIG. 12 and the processing of the second exemplary embodiment shown in FIG. 27-FIG. 28, so that only the processing operation different from the above-described first and second exemplary embodiments will be described in detail by referring to FIG. 34-FIG. 36.

The microprocessor 3 upon starting the input judgment processing first judges whether or not a vibration is detected by any of the first detection modules A1-A3 and the second detection module B1 (step c1).

When the vibration is not detected by any of the first detection modules A1-A3 and the second detection module B1, it means that there is no tapping operation made by the user on the back of the hand. Thus, the microprocessor 3 executes processing regarding the basic function of the PDA 2" as in conventional cases (step c8), and ends the input judgment processing of this period. When the tapping operation by the user is not detected, only the judgment processing of step c1 and the processing of step c8 are repeatedly executed. Thus, the PDA 2" functions in the same manner as that of the conventional PDA.

In the meantime, when the user executes a tapping operation on the back of the hand and taps one of the areas out of "a", "ka", "sa"/"ta", "na", "ha"/"ma", "ya"/"ra", and "wa" by the hand that is not holding the PDA 2", a first vibration is detected by one of the first detection modules A1-A3 or the second detection module B1 (step c1).

The microprocessor 3 upon confirming that the first vibration is detected by one of the first detection modules A1-A3 or the second detection module B1 first sets an initial value "1" to a writing position identifying index j which identifies the column of the sampling data storage table TB 1 generated within the RAM 5 for storing sampling data (step c2).

Then, the microprocessor 3 reads all of current values a1-a3 and b1 of the signals outputted from the first detection modules A1-A3 and the second detection module B1, and writes those values a1-a3 and b1 to the j-th column of the sampling data storage table TB 1 as shown in FIG. 15 based on the current value of the wiring position identifying index j (step c3).

Further, the microprocessor 3 judges whether or not the current value of the writing position identifying index j is within a range of sampling number m set in advance (step c4). When the current value of the writing position identifying index j is within the range of sampling number m set in advance, the microprocessor 3 increments the value of the writing position identifying index j by "1" (step c5), and sets a sampling period Δt to a sampling timer and starts the timer (step c6).

Further, the microprocessor 3 stands by until the sampling timer counts the sampling period Δt (step c7). When it is confirmed that the set sampling period Δt has passed, the microprocessor 3 shifts to the processing of step c3 again, and repeatedly executes the processing operation of step c3-step c7 in the same manner as described above.

Therefore, the sampling processing of the period Δt is started at the point where the first vibration is detected by one of the first detection modules A1-A3 or the second detection module B1. In the sampling data storage table TB 1, m-numbers each of the signals of the vibrations outputted from the first detection modules A1-A3 and the second detection module B1 are stored in a time series manner, i.e., over the sampling period of Δt·m in terms of time as shown in FIG. 15.

Further, when it is confirmed by the judgment processing executed in step c4 that the current value of the writing position identifying index j has reached the sampling number m set in advance, the microprocessor 3 functioning as the vibration analyzing module F reads a series of sampling data b(1, 1)-b(1, m) regarding the vibration detected by the second detection module B1 from the sampling data storage table TB 1 as shown in FIG. 15 (step c9), and acquires the value j of the number of sampling times corresponding to the fall point of the vibration through executing differentiation processing on the data sequence b(1, 1)-b(1, m) (step c10). Further, the microprocessor 3 acquires the generation time of the fall of the vibration by having the point at which the first vibration is detected as the start point through multiplying the value j of the number of sampling times by the sampling period Δt, and stores the time to a second-detection-module fall generation time storage register Tb (step c11).

Then, the microprocessor 3 functioning as the vibration analyzing module F reads a series of sampling data a(1, 1)-a(1, m) regarding the vibration detected by the first detection module A1 from the sampling data storage table TB 1 as shown in FIG. 15 (step c12), and acquires the value j of the number of sampling times corresponding to the fall point of the vibration through executing differentiation processing on the data sequence a(1, 1)-a(1, m) (step c13). Further, the microprocessor 3 acquires the generation time of the fall of the vibration by having the point at which the first vibration is detected as the start point through multiplying the value j of the number of sampling times by the sampling period Δt, and stores the time to a first-detection-module fall generation time storage register Ta1 (step c14).

Further, the microprocessor 3 functioning as the vibration analyzing module F repeatedly executes the processing equivalent to the processing described above on a series of sampling data a(2, 1)-a(2, m) regarding the vibration detected by the first detection module A2 and a series of sampling data a(3, 1)-a(3, m) regarding the vibration detected by the first detection module A3 to acquire the generation time of the fall of the vibration detected by the first detection module A2 and stores it to a first-detection-module fall generation time storage register Ta2, and acquires the generation time of the fall of the vibration detected by the first detection module A3 and stores it to a first-detection module fall generation time storage register Ta3 (step c15-step c20).

Then, the microprocessor 3 functioning as the vibration analyzing module F subtracts the value of the second-detection-module fall generation time storage register Tb from the value of the first-detection-module fall generation time storage register Ta1 to calculate the time difference t1 regarding the detection timings between the detection time of the vibration by the first detection module A1 and the vibration detection time detected by the second detection module B1, subtracts the value of the second-detection-module fall generation time storage register Tb from the value of the first-detection-module fall generation time storage register Ta2 to calculate the time difference t2 regarding the detection timings between the detection time of the vibration by the first detection module A2 and the vibration detection time detected by the second detection module B1, subtracts the value of the second-detection-module fall generation time storage register Tb from the value of the first-detection-module fall generation time storage register Ta3 to calculate the time difference t3 regarding the detection timings between the detection time of the vibration by the first detection module A3 and the vibration detection time detected by the second detection module B1, and stores those values to a first analysis data storage register t1, a second analysis data storage register t2, and a third analysis data storage register t3 (step c21).

Then, the microprocessor 3 functioning as an each-region operation point identifying function of the operation point identifying module sets an initial value "1" to an area identifying index i for identifying the actually tapped area (step c22), reads combinations of the upper-limit value and lower-limit value of the data sequence of the i-th row from a table TB 3 as shown in FIG. 33 functioning as a database that stores the corresponding relation of the upper-limit values and the lower-limit values of the time differences regarding the detection timings required for judging the area based on the current value of the index i (step c23), and judges whether or not all the time differences t1, t2, and t3 regarding the detection timings that are the combinations of the analysis data acquired by the processing of step c21 are included between the corresponding upper-limit value and the lower-limit value (step c24).

When there is even one detection timing difference that is not included between the upper-limit value and the lower-limit value out of the detection timing differences t1, t2, and t3 as the analysis data, the microprocessor 3 functioning as the each-region operation point identifying function achieving module of the operation point identifying module G judges whether or not the current value of the index i is within the range of "n" that is the total number (n=10 in this exemplary embodiment) (step c25). Then, when the current value of the index i is within the range of "n" that is the total number of the set areas, the microprocessor 3 functioning as the operation point identifying module G increments the value of the index i by "1" again (step c26), and repeatedly executes the processing of step c23-step c26 in the same manner based on the current value of the updated index i.

For example, when the area i having the upper-limit value and the lower-limit value sandwiching the detection timing time differences t1, t2, and t3 therebetween is detected while repeatedly executing the processing from step c23 to step c26 and the judgment result of step c25 turns out as true, it means that the tapping operation is conducted in the second area i. Thus, the microprocessor 3 functioning as the each-region operation point identifying function achieving module of the operation point identifying module G displays the options of the command input corresponding to the area i on the display 8 of the PDA 2" (step c28).

For example, as can be seen from the table of FIG. 33, when the value of index i is '2', it means that there is a tapping operation made on the area of "ta" row. Thus, "ta", "ti", "tu", "te" and "to" in the hiragana characters are displayed on the display 8 of the PDA 2" as the hiragana characters that can be inputted.

Naturally, when the value of i is '1', "sa", "si", "su", "se", and "so" that are the hiragana characters of "sa" row are displayed as the hiragana characters that can be inputted. Further, when the value of i is '3', "na", "ni", "nu", "ne", and "no" that are the hiragana characters of "na" row are displayed on the display 8 of the PDA 2" as the hiragana characters that can be inputted.

While the selecting operation of the actually inputted hiragana character is done by an instruction selecting operation using the command key 9 or the touch panel 10 (step c29), specific explanations thereof will be omitted since it is an already known fact.

In the meantime, when the judgment result of step c25 turns out as true because the current value of the area identifying index i exceeds the range of "n" that is the total number of the areas while repeatedly executing the processing from step c23 to step c26, it means that there is no area i having the upper-limit value and the lower-limit value including the time differences t1, t2, and t3 as the combination of the analysis data detected even after searching the upper-limit values and the lower-limit values of all the areas of i=1 to n, i.e., it means that the tapping operation is inappropriate. Thus, the microprocessor 3 functioning as the each-region operation point identifying function achieving module of the operation point identifying module G displays an error message on the display 8 of the PDA 2" and ends the input judgment processing (step c27), and returns to an initial standby state to wait for a vibration to be detected by any of the first detection modules A1-A3 and the second detection module B1 to stand by for a retry input of a tapping operation.

In order to utilize the external disturbance eliminating function of the second exemplary embodiment described above, the third detection module C1 may be disposed at a position where the body holding the PDA 2" does not make a contact and in the vicinity of the second detection module B1 to eliminate the vibration transmitted through the casing as in the case of the second exemplary embodiment.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application is the National Phase of PCT/JP2009/061605, filed Jun. 25, 2009, which claims the Priority right based on Japanese Patent Application No. 2008-222932 filed on Aug. 29, 2008 and the disclosure thereof is hereby incorporated by reference in its entirety.

INDUSTRIAL APPLICABILITY

The present invention can be used as a command input device that is utilized in mobile information devices placing the importance on the portability, e.g., mobile phones, PDAs (Personal Digital Assistants), notebook PCs, as well as mobile information devices placing the importance on the display unit such as a display.

REFERENCE NUMERALS

1 Command input device
1' Command input device
1" Command input device
2 PDA (Personal Digital Assistants)
2' PDA (Personal Digital Assistants)
2" PDA (Personal Digital Assistants)
3 Microprocessor (vibration analyzing module, operation point identifying module)
4 ROM (judgment data storage module)
5 RAM
6 Nonvolatile memory
7 Input/output circuit
8 Display
9 Command key
10 Touch panel
11 Wiring board
12 Key top
13a, 13b Anti-vibration member
14 Main body part
15 Frame part
A1-A4 First detection module (acceleration sensor)
B1 Second detection module (acceleration sensor)
C1 Third detection module (acceleration sensor)
C Command input unit
D Database
E Judgment data storage module
F Vibration analyzing module
G Operation point identifying module
X1 Body-side vibration transmission path
X2 Terminal transmission path

The invention claimed is:

1. A command input device structured to perform command input processing by recognizing input processing contents according to a position at which an input operation is conducted, the device comprising:
a command input unit in which first and second detection means for detecting vibrations generated by a tapping operation made on a body of a user and transmitted via the body of the user are disposed by opposing to each other to be in contact with the body of the user at different positions on the command input device when the user holds the command input device, and third detection means for detecting a vibration transmitting inside the command input device is disposed at a position not to be in contact with the body of the user,
the command input device further comprises a tapped position judging module comprising:
judgment data storage means for storing in advance a corresponding relation between analysis data acquired by analyzing association regarding vibrations transmitted to the first and second detection means via the body of the user and the positions of the tapping operations made on the body of the user as a database;
external disturbance eliminating function executing means for subtracting the vibration detected by the third detection means from the vibration detected by the second detection means every time the vibrations are detected by the first and second detection means, replacing the vibration detected by the second detection means with the vibration acquired from the subtraction, and outputting the vibration acquired from the subtraction;
vibration analyzing means for acquiring analysis data by analyzing association regarding the vibration detected by the first detection means and vibration outputted from the external disturbance eliminating function executing means; and
operation point identifying means for identifying the position of the tapping operation made on the body of the user through searching the database in the judgment data storage means based on the analysis data acquired by the vibration analyzing means, and recognizing the position of the tapping operation as a position at which the input operation is conducted.

2. The command input device as claimed in claim 1, wherein
the judgment data storage means stores points of tapping operations set by corresponding to body regions that connect parts of the body in contact with the first and second detection means as the points of the tapping operations made on the body of the user.

3. The command input device as claimed in claim 1, wherein:
the first detection means are disposed at a plurality of points on the command input device by corresponding to each of end parts branched from the body of the user, while the second detection means is disposed at a point that comes in contact with the part of the body connected to base parts of the end parts;
a corresponding relation between the analysis data and points of the tapping operations is stored in the database of the judgment data storage means by corresponding to each of the first detection means; and
the operation point identifying module is provided with an each-end-part operation point identifying function which identifies the first detection module that is in contact with the end part where the tapping operation is conduced based on properties of the vibrations detected by each of the first detection modules, and identifies the point of the tapping operation based on the identified first detection module and the point of the tapping operation acquired by searching the database corresponding to the identified first detection module.

4. The command input device as claimed in claim 1, wherein:
the first detection means are disposed at a plurality of points on the command input device to be selectively contactable by the body of the user;
a corresponding relation between the analysis data and points of the tapping operations is stored in the database of the judgment data storage means by corresponding to each of the first detection means; and
the operation point identifying means is provided with an each-detection-module operation point identifying means which identifies the first detection means where the tapping operation is conducted based on whether or not there is any vibration detected by each of the first detection means, and identifies the point of the tapping operation based on the identified first detection means and the point of the tapping operation acquired by searching the database corresponding to the identified first detection means.

5. The command input device as claimed in claim 1, wherein:
the first detection means are disposed at a plurality of points on the command input device by corresponding to each of end parts branched from the body of the user, while the second detection means is disposed at a point that comes in contact with the part of the body connected to base parts of the end parts;
a corresponding relation between combinations of the analysis data acquired by analyzing associations regarding vibrations detected by each of the first detection means and vibrations detected by the second detection means and the points of the tapping operations is stored in the database of the judgment data storage means; and
the operation point identifying means is provided with an each-region operation point identifying function which identifies the point of the tapping operation made on the body of the user by searching the database of the judgment data storage means based on the combinations of the analysis data that is acquired by analyzing association of the vibrations detected by each of the first detection means and the vibrations detected by the second detection means.

6. The command input device as claimed in claim 1, wherein
the first and second detection means are structured by acceleration sensors which detect vibrations constituted with components of one or more directions.

7. The command input device as claimed in claim 1, wherein
the analysis data is a time difference of detection timings of the vibrations detected by the first detection means and the second detection means.

8. The command input device of claim 1, wherein the command input device is loaded into a mobile information device.

* * * * *